(12) United States Patent
Huang et al.

(10) Patent No.: US 10,411,851 B2
(45) Date of Patent: Sep. 10, 2019

(54) WIRELESS COMMUNICATION METHOD, DEVICE AND SYSTEM

(71) Applicant: Huawei Technologies Co., Ltd., Shenzhen (CN)

(72) Inventors: Huang Huang, Chengdu (CN); Sainan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 15/605,759

(22) Filed: May 25, 2017

(65) Prior Publication Data

US 2017/0264404 A1 Sep. 14, 2017

Related U.S. Application Data

(63) Continuation of application No. PCT/CN2014/092247, filed on Nov. 26, 2014.

(51) Int. Cl.
*H04W 4/00* (2018.01)
*H04L 5/00* (2006.01)
(Continued)

(52) U.S. Cl.
CPC .............. *H04L 5/0032* (2013.01); *H04L 5/14* (2013.01); *H04W 72/0406* (2013.01); *H04W 72/048* (2013.01); *H04W 72/085* (2013.01)

(58) Field of Classification Search
CPC ...... H04L 5/0032; H04L 5/14; H04W 72/085; H04W 72/0406; H04W 72/048
(Continued)

(56) References Cited

U.S. PATENT DOCUMENTS 7,457,895 B2 * 11/2008 Bilak ...................... H04L 49/90
710/36
8,695,034 B2 * 4/2014 Butcher ............. H04N 5/44504
348/584
(Continued)

FOREIGN PATENT DOCUMENTS

| CN | 101635929 A | 1/2010 |
|---|---|---|
| CN | 102055504 A | 5/2011 |

(Continued)

OTHER PUBLICATIONS

Broadcom Corporation, "Architectures for dual connectivity", 3GPP TSG RAN WG2 Meeting #81bis, R2-130989, Chicago, USA, Apr. 15-19, 2013, 12 pages.
(Continued)

*Primary Examiner* — Chuong T Ho
(74) *Attorney, Agent, or Firm* — Slater Matsil, LLP

(57) ABSTRACT

Embodiments of the present application relate to the field of communications technologies, and provide a wireless communication method, a device, and a system, so as to cancel or reduce inter-cell interference, to a terminal, between neighboring cells. The method includes: sending, by a terminal, uplink information to a first network side device in a first time period; and receiving, by the terminal in a second time period, downlink information sent by a second network side device, where the first time period and the second time period are a same time period. The embodiments of the present application are used for wireless communication.

11 Claims, 20 Drawing Sheets

(51) Int. Cl.
*H04L 5/14* (2006.01)
*H04W 72/04* (2009.01)
*H04W 72/08* (2009.01)

(58) Field of Classification Search
USPC .................................................. 370/329, 330
See application file for complete search history.

(56) References Cited

U.S. PATENT DOCUMENTS

| | | | |
|---|---|---|---|
| 2004/0233924 A1* | 11/2004 | Bilak | .................. H04L 49/90 |
| | | | 370/412 |
| 2008/0227487 A1 | 9/2008 | Daniels et al. | |
| 2009/0135748 A1 | 5/2009 | Lindoff et al. | |
| 2009/0143016 A1* | 6/2009 | Li | .................. H04W 52/343 |
| | | | 455/63.1 |
| 2011/0223928 A1 | 9/2011 | Seo et al. | |
| 2011/0243040 A1 | 10/2011 | Khan et al. | |
| 2012/0099452 A1 | 4/2012 | Dai et al. | |
| 2012/0269178 A1* | 10/2012 | Li | .................. H04W 56/0045 |
| | | | 370/336 |
| 2013/0242855 A1 | 9/2013 | Kim et al. | |
| 2014/0119317 A1* | 5/2014 | Kim | .................. H04L 5/0048 |
| | | | 370/329 |
| 2014/0328228 A1 | 11/2014 | Park et al. | |
| 2015/0172016 A1 | 6/2015 | Wang et al. | |
| 2017/0005770 A1* | 1/2017 | Shimezawa | .................. H04L 1/00 |
| 2019/0090265 A1* | 3/2019 | Zhang | .................. H04L 5/0007 |

FOREIGN PATENT DOCUMENTS

| | | |
|---|---|---|
| CN | 102695264 A | 9/2012 |
| CN | 102761400 A | 10/2012 |
| CN | 102783235 A | 11/2012 |
| CN | 103379550 A | 10/2013 |
| CN | 104113905 A | 10/2014 |
| EP | 2148546 A1 | 1/2010 |
| EP | 2945447 A1 | 11/2015 |
| KR | 20100064424 A | 6/2010 |
| KR | 20120025615 A | 3/2012 |
| KR | 20130058567 A | 6/2013 |
| KR | 20130099170 A | 9/2013 |
| RU | 2358385 C2 | 6/2009 |
| RU | 2407157 C1 | 12/2010 |
| WO | 2008112573 A1 | 9/2008 |
| WO | 2014109302 A1 | 7/2014 |
| WO | 2014185647 A1 | 11/2014 |

OTHER PUBLICATIONS

Rainer Schoenen et al: "Concurrent Operation of Half-and Full-Duplex Terminals in Future Multi-Hop FDD Based Cellular Networks", 2008 4th International Conference on Wireless Communications, Networking and Mobile Computing, Oct. 1, 2008, XP055160666, pp. 1-7.

CMCC: "Discussion on Full/Non-Full Duplex UE for TDD-FDD CA," 3GPP TSG RAN WG1 Meeting #76, R1-140591, Feb. 10-14, 2014, Prague, Czech Republic, 4 pages.

IEEE Standards Association, IEEE Standard for Information technology—Telecommunications and information exchange between systems, Local and metropolitan area networks—Specific requirements, "Part 11: Wireless LAN Medium Access Control (MAC) and Physical Layer (PHY) Specifications, Amendment 3: Enhancements for Very High Throughput in the 60 GHz Band," IEEE Computer Society, IEEE Std 802.11ad, Dec. 28, 2012, 628 pages.

\* cited by examiner

WIRELESS COMMUNICATION METHOD, DEVICE AND SYSTEM

CROSS-REFERENCE TO RELATED APPLICATIONS

This application is a continuation of International Application No.PCT/CN2014/092247, filed on Nov. 26, 2014, the disclosure of which is hereby incorporated by reference in its entirety.

TECHNICAL FIELD

Embodiments of the present application relate to the field of communications technologies, and in particular, to a wireless communication method, a device, and a system.

BACKGROUND

With large-scale popularity of terminals such as smartphones and tablet computers, a cellular access rate exponentially increases, and a conventional low-frequency radio access technology is increasingly incapable of meeting a growing access rate requirement.

To improve an access rate, a method of high-density base stations is used currently, so that coverage of each base station becomes smaller and the base stations become denser, so as to provide a higher access rate for a terminal in unit coverage. For example, if coverage of a first cell cell1 corresponding to a first base station eNB1 is 1 square kilometer, there are 70 terminals in the first cell cell1, and the eNB1 can provide an access rate of 7 Gbps, each terminal can obtain an access rate of 100 Mbps on average. As shown in FIG. 1, if seven base stations are configured in the 1 square kilometer covered by the cell1, seven cells (a cell2 to a cell8) corresponding to the seven base stations (an eNB2 to an eNB8) jointly cover the original cell cell1 corresponding to the eNB1, and a cell corresponding to each base station in the eNB2 to the eNB8 covers one-seventh of the cell1, and if the 70 terminals are evenly distributed in areas covered by the cell2 to the cell8, each base station in the eNB2 to the eNB8 serves ten terminals on average. In this case, if each base station in the eNB2 to the eNB8 provides an access rate of 7 Gbps, each terminal can obtain an access rate of 700 Mbps on average.

However, in the currently used method of high-density base stations, because base stations are denser, inter-cell interference (ICI for short) between neighboring cells is stronger, and performance of a cell-edge user deteriorates. Consequently, expansion of a cell capacity is greatly limited. As shown in FIG. 1, there is an overlap area between neighboring cells corresponding to neighboring base stations. When a terminal is located in the overlap area, when the terminal receives downlink information sent by a base station, the terminal is subject to interference from downlink information sent by a base station of a neighboring cell, that is, ICI.

SUMMARY

The present application provides a wireless communication method, a device, and a system, to cancel or reduce inter-cell interference, to a terminal, between neighboring cells.

To achieve the foregoing objective, the following technical solutions are used in the embodiments of the present application.

According to one aspect, a wireless communication method includes sending, by a terminal, uplink information to a first network side device in a first time period and receiving, by the terminal in a second time period, downlink information sent by a second network side device. The first time period and the second time period are a same time period.

According to another aspect, a wireless communication method includes obtaining, by a first network side device, transmission mode information. The transmission mode information is used to instruct the first network side device to receive, in a first time period, uplink information sent by a terminal. The method further includes receiving, by the first network side device in the first time period according to the transmission mode information, the uplink information sent by the terminal. The first time period and a second time period are a same time period, and the second time period is used by a second network side device to send downlink information to the terminal.

According to another aspect, a terminal comprises a receiver; a transmitter; a processor; a memory storing a program to be executed in the processor; and a bus. The receiver, the transmitter, the memory, and the processor are connected and implement mutual communication by using the bus. The memory is configured to store data processed by the processor. The transmitter is configured to send uplink information to a first network side device in a first time period. The receiver is configured to receive, in a second time period, downlink information sent by a second network side device. The first time period and the second time period are a same time period.

According to another aspect, a first network side device comprises a receiver; a transmitter; a processor; a memory comprising a program to be executed in the processor; and a bus. The receiver, the transmitter, the memory, and the processor are connected and implement mutual communication by using the bus. The memory is configured to store data processed by the processor. The program comprises instructions for obtaining transmission mode information. The transmission mode information is used to instruct the first network side device to receive, in a first time period, uplink information sent by a terminal. The receiver is configured to receive, according to the transmission mode information obtained by the processor, the uplink information sent by the terminal. The first time period and a second time period are a same time period. The second time period is used by a second network side device to send downlink information to the terminal.

According to another aspect, a wireless communication method is provided, where the method is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the method includes: sending, by the terminal, uplink information to the first network side device in a first time period; and receiving, by the terminal in a second time period, downlink information sent by the second network side device; where the first time period and the second time period are a same time period.

According to another aspect, a wireless communication method is provided, where the method is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the second network side device sends downlink information to the terminal in a second time period; and the method includes: obtaining, by the first network side device, transmission mode information, where the transmission mode information is used to instruct the first network side device to receive, in a first time period, uplink information sent by the terminal; and receiving, by the first network side device in the first time period according to the transmission mode information, the uplink information sent by the terminal; where the first time period and the second time period are a same time period.

According to another aspect, a wireless communication method is provided, where the method is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the first network side device receives, in a first time period, uplink information sent by the terminal; and the method includes: obtaining, by the second network side device, transmission mode information, where the transmission mode information is used to instruct the second network side device to send downlink information to the terminal in a second time period; and sending, by the second network side device, the downlink information to the terminal in the second time period according to the transmission mode information; where the first time period and the second time period are a same time period.

According to another aspect, a terminal is provided, where the terminal is applied to a high-frequency communications system that includes at least one terminal and at least two network side devices, the at least two network side devices include a first network side device and a second network side device, a first cell corresponding to the first network side device is adjacent to a second cell corresponding to the second network side device, and the at least one terminal is located in an overlap area of the first cell and the second cell; and the terminal includes: a sending unit, configured to send uplink information to the first network side device in a first time period; and a receiving unit, configured to receive, in a second time period, downlink information sent by the second network side device; where the first time period and the second time period are a same time period.

According to another aspect, a first network side device is provided, where the network side device is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the second network side device sends downlink information to the terminal in a second time period; and the network side device includes: an obtaining unit, configured to obtain transmission mode information, where the transmission mode information is used to instruct the first network side device to receive, in a first time period, uplink information sent by the terminal; and a receiving unit, configured to: receive the transmission mode information from the obtaining unit, and receive, according to the transmission mode information, the uplink information sent by the terminal; where the first time period and the second time period are a same time period.

According to another aspect, a second network side device is provided, where the network side device is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the first network side device receives, in a first time period, uplink information sent by the terminal; and the network side device includes: an obtaining unit, configured to obtain transmission mode information, where the transmission mode information is used to instruct the second network side device to send downlink information to the terminal in a second time period; and a sending unit, configured to: receive the transmission mode information from the obtaining unit, and send the downlink information to the terminal in the second time period according to the transmission mode information; where the first time period and the second time period are a same time period.

According to another aspect, a terminal is provided, where the terminal is applied to a high-frequency communications system that includes at least one terminal and at least two network side devices, the at least two network side devices include a first network side device and a second network side device, a first cell corresponding to the first network side device is adjacent to a second cell corresponding to the second network side device, and the at least one terminal is located in an overlap area of the first cell and the second cell; and the terminal includes a receiver, a transmitter, a memory, a processor, and a bus, the receiver, the transmitter, the memory, and the processor are connected and implement mutual communication by using the bus, and the memory is configured to store data processed by the processor; the transmitter is configured to send uplink information to the first network side device in a first time period; and the receiver is configured to receive, in a second time period, downlink information sent by the second network side device; where the first time period and the second time period are a same time period.

According to another aspect, a first network side device is provided, where the network side device is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the second network side device sends downlink information to the terminal in a second time period; and the network side device includes a receiver, a transmitter, a memory, a processor, and a bus, the receiver, the transmitter, the memory, and the processor are connected and implement mutual communication by using the bus, and the memory is configured to store data processed by the processor; the processor is configured to obtain transmission mode information, where the transmission mode information is used to instruct the first network side device to receive, in a first time period, uplink information sent by the terminal; and the receiver is configured to receive, according to the transmission mode information obtained by the processor, the uplink information sent by the terminal; where the first time period and the second time period are a same time period.

According to another aspect, a second network side device is provided, where the network side device is applied to a high-frequency communications system that includes at least one terminal and at least two network side devices, the at least two network side devices include a first network side device and a second network side device, a first cell corresponding to the first network side device is adjacent to a second cell corresponding to the second network side device, the at least one terminal is located in an overlap area of the first cell and the second cell, and the first network side device receives, in a first time period, uplink information sent by the terminal; and the network side device includes a receiver, a transmitter, a memory, a processor, and a bus, the receiver, the transmitter, the memory, and the processor are connected and implement mutual communication by using the bus, and the memory is configured to store data processed by the processor; the processor is configured to obtain transmission mode information, where the transmission mode information is used to instruct the second network side device to send downlink information to the terminal in a second time period; and the transmitter is configured to: receive the transmission mode information from the processor, and send the downlink information to the terminal in the second time period according to the transmission mode information; where the first time period and the second time period are a same time period.

According to another aspect, a high-frequency communications system is provided, where the system includes a terminal, a first network side device, and a second network side device, where the terminal is the terminal in any one of the fourth aspect, or possible implementation manners of the fourth aspect; the first network side device is the first network side device in any one of the fifth aspect, or possible implementation manners of the fifth aspect; and the second network side device is the second network side device in any one of the sixth aspect, or possible implementation manners of the sixth aspect; or the terminal is the terminal in any one of the seventh aspect, or possible implementation manners of the seventh aspect; the first network side device is the first network side device in any one of the eighth aspect, or possible implementation manners of the eighth aspect; and the second network side device is the second network side device in any one of the ninth aspect, or possible implementation manners of the ninth aspect.

According to the wireless communication method, the device, and the system that are provided above, when a terminal is located in an overlap area of a first cell and a second cell, only one network side device sends downlink information to the terminal in a same time period because the terminal performs uplink information transmission with a first network side device in a first time period, the terminal performs downlink information transmission with a second network side device in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Figure 1:
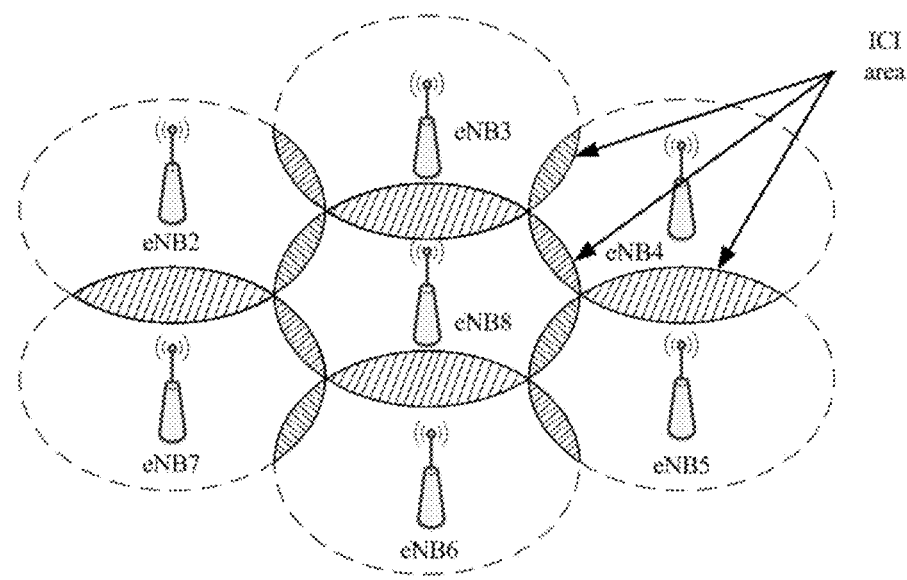
FIG. 1 is a schematic diagram of an inter-cell interference area in the prior art.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

A terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN for short). The wireless terminal may be a mobile terminal such as a mobile phone (or referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communications service (PCS for short) phone, a cordless telephone set, a Session Initiation Protocol (SIP for short) phone, a wireless local loop (WLL for short) station, or a personal digital assistant (PDA for short). The wireless terminal may be referred to as a system, a subscriber unit, a subscriber station, a mobile station (MS for short), a mobile station, a remote station, an access point (AP for short), a remote terminal, an access terminal, a user terminal, a user agent, user device, or user equipment (UE for short).

A network side device in the embodiments of the present application includes but is not limited to a base station such as a macro base station, a micro base station, a picocell base station, a small cell, a relay node, or a remote radio unit. For example, the network side device may refer to a device that is in an access network and that communicates, over an air interface, with a wireless terminal by using one or more sectors. The network side device may be configured to mutually convert a received over-the-air frame and an Internet Protocol (IP for short) packet, and serve as a router between the wireless terminal and a remaining portion of the access network. The remaining portion of the access network may include an IP protocol network. The network side device may further coordinate attribute management of the air interface. For example, the network side device may be a base transceiver station (BTS for short) in GSM (Global System for Mobile Communications) or CDMA (Code Division Multiple Access), or may be a NodeB in WCDMA (Wideband Code Division Multiple Access), or may be an evolved NodeB (English: evolutional Node B) in LTE. This is not limited in the embodiments of the present application.

It should be noted that, in the embodiments of the present application, "uplink" refers to a data transmission direction in which a network side device receives data, that is, uplink receiving, and "downlink" refers to a data transmission direction in which a network side device sends data, that is, downlink sending. Other cases shall be subject to this unless otherwise specified, and certainly, other variations or replacements based on this shall fall within the protection scope of the present application.

Figure 2:
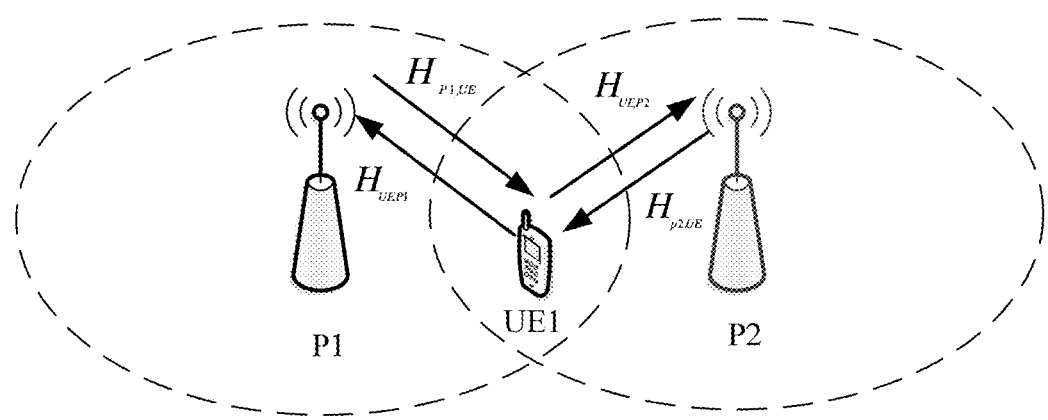
FIG. 2 is a schematic structural diagram of a high-frequency communications system according to an embodiment of the present application.

The embodiments of the present application are applied to a high-frequency communications system shown in FIG. 2. The high-frequency communications system includes at least one terminal UE1 and at least two network side devices (P1 and P2), a first cell corresponding to P1 is adjacent to a second cell corresponding to P2, and the UE1 is located in an overlap area of the first cell and the second cell. A channel from the first network side device P1 to the terminal UE1 is $H_{P1,UE}$, a channel from the terminal UE1 to the first network side device P1 is $H_{UE,P1}$, a channel from the second network side device P2 to the terminal UE1 is $H_{p2,UE}$, and a channel from the terminal UE1 to the second network side device P2 is $H_{UE,P2}$.

Specifically, an embodiment of the present application provides a wireless communication method, and the method is applied to the high-frequency communications system shown in FIG. 2. The high-frequency communications system includes at least one terminal UE1 and at least two network side devices, the at least two network side devices include a first network side device P1 and a second network side device P2, a first cell corresponding to the first network side device P1 is adjacent to a second cell corresponding to the second network side device P2, and the at least one terminal is located in an overlap area of the first cell and the second cell.

Figure 3:
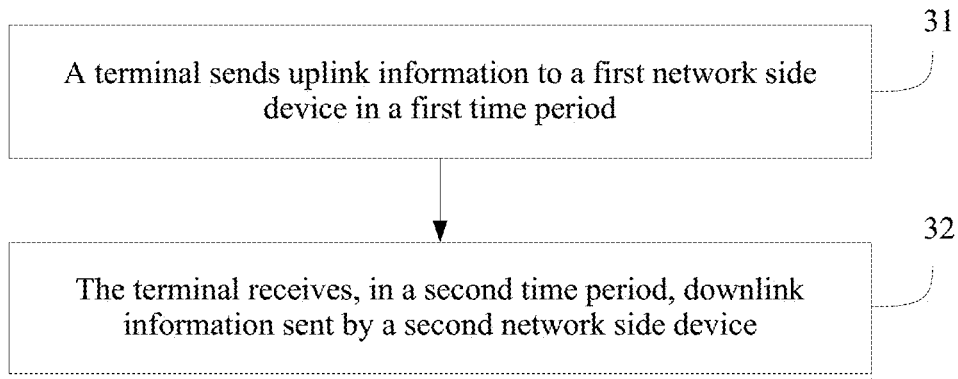
FIG. 3 is a schematic flowchart of a wireless communication method according to an embodiment of the present application.

As shown in FIG. 3, the terminal UE1 performs the following steps:

31. The terminal sends uplink information to the first network side device in a first time period.

32. The terminal receives, in a second time period, downlink information sent by the second network side device.

The first time period and the second time period are a same time period.

A time sequence of the foregoing steps 31 and 32 is not limited.

In this embodiment of the present application, the terminal forms at least two beams, where at least one beam is used to send the uplink information, and at least one beam is used to receive the downlink information. For example, in the high-frequency communications system, a device generally sends and receives information by using an antenna array, and forms multiple narrow beams by using large-scale antenna arrays, to improve gains. When such a device is applied to the terminal in this embodiment of the present application, the terminal may form multiple narrow beams by using multiple antenna arrays, some narrow beams are used to send the uplink information, and the other narrow beams are used to receive the downlink information, thereby implementing the wireless communication method provided in this embodiment of the present application.

Figure 4:
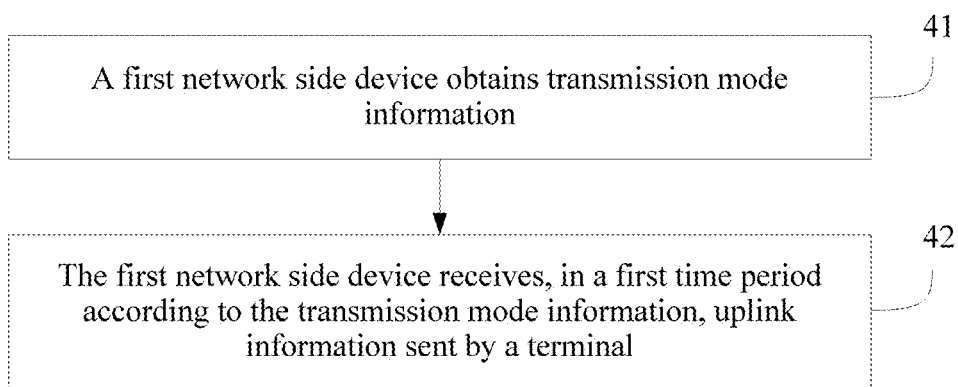
FIG. 4 is a schematic flowchart of another wireless communication method according to an embodiment of the present application.

As shown in FIG. 4, the first network side device P1 performs the following steps:

41. The first network side device obtains transmission mode information, where the transmission mode information is used to instruct the first network side device to receive, in a first time period, uplink information sent by the terminal.

42. The first network side device receives, in the first time period according to the transmission mode information, the uplink information sent by the terminal.

Figure 5:
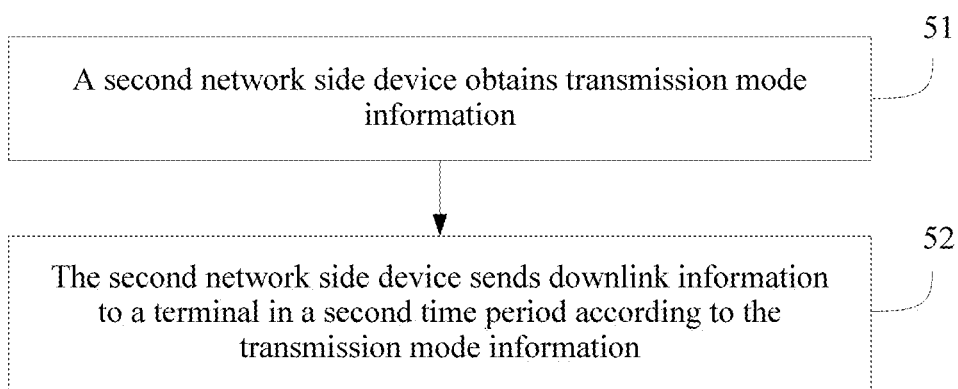
FIG. 5 is a schematic flowchart of still another wireless communication method according to an embodiment of the present application.

As shown in FIG. 5, the second network side device P2 performs the following steps:

51. The second network side device obtains transmission mode information, where the transmission mode information is used to instruct the second network side device to send downlink information to the terminal in a second time period.

52. The second network side device sends the downlink information to the terminal in the second time period according to the transmission mode information.

Referring to a prior-art manner of determining that a terminal is located on the edge of a cell, in the foregoing embodiment, the first network side device P1 and the second network side device P2 may determine, in a manner of determining whether the terminal is located on the edge of a cell, whether the terminal is located in the overlap area of the first cell and the second cell. For example, the first network side device P1 and the second network side device P2 determine, by detecting energy of the uplink information sent by the terminal, whether the terminal is located in the overlap area of the first cell and the second cell, and when the terminal is located in the overlap area, the first network side device P1 and the second network side device P2 communicate with the terminal in the overlap area in the manner provided in the foregoing embodiment.

In the foregoing embodiment, when a terminal is located in an overlap area of a first cell and a second cell, only one network side device sends downlink information to the terminal in a same time period because the terminal performs uplink information transmission with a first network side device in a first time period, the terminal performs downlink information transmission with a second network side device in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided.

Figure 6:
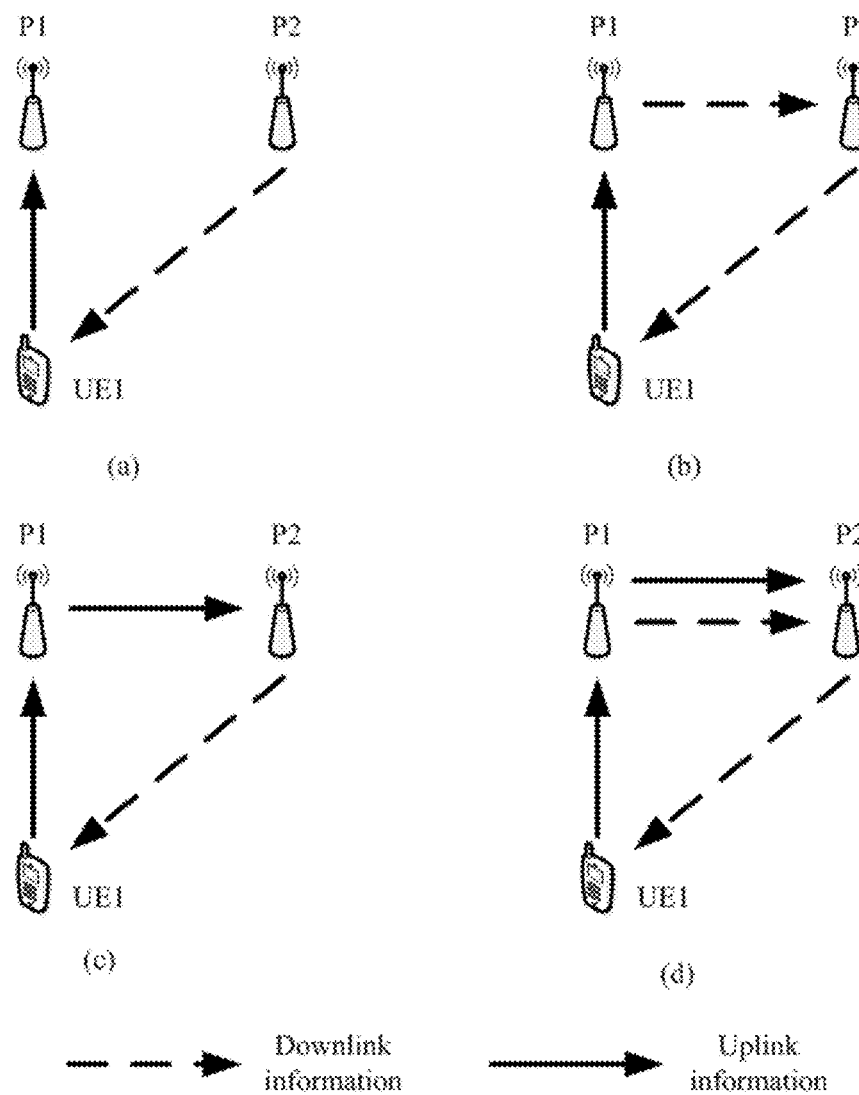
FIG. 6 is a schematic diagram of an information transmission mode according to an embodiment of the present application.

In the foregoing embodiment, a transmission mode corresponding to the transmission mode information is shown in FIG. 6(a). Data transmission between the first network side device P1 and the terminal UE1 and data transmission between the second network side device P2 and the UE1 are separately performed, the terminal UE1 sends the uplink information to the first network side device P1, the second network side device P2 sends the downlink information to the UE1, and no data transmission is performed between the first network side device P1 and the second network side device P2. Because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of the high-frequency communications system.

Optionally, as shown in FIG. 6(c), for the first network side device P1, the transmission mode information is further used to instruct the first network side device P1 to send, to the second network side device P2, the uplink information that is sent by the terminal UE1 and is received in the first time period, and the first network side device P1 is further configured to execute the following method.

After the first network side device P1 receives, in the first time period according to the transmission mode information, the uplink information sent by the terminal, the first network side device P1 sends, to the second network side device P2 according to the transmission mode information, the uplink information that is sent by the terminal UE1 and is received in the first time period.

For the second network side device P2, the transmission mode information is further used to instruct the second network side device P2 to receive the uplink information that is sent by the terminal UE1, received by the first network side device P1 in the first time period, and sent by the first network side device P1, and the second network side device P2 is further configured to execute the following method.

Before the second network side device P2 sends the downlink information to the terminal in the second time period according to the transmission mode information, the second network side device receives, according to the transmission mode information, the uplink information that is sent by the terminal, received by the first network side device in the first time period, and sent by the first network side device.

Still optionally, as shown in FIG. 6(b), for the first network side device P1, the transmission mode information is further used to instruct the first network side device P1 to send, to the second network side device P2, the uplink information that is sent by the terminal and is received in the first time period, and after the first network side device P1 receives, in the first time period according to the transmission mode information, the uplink information sent by the terminal UE1, the first network side device P1 is further configured to execute the following method.

The first network side device P1 sends, to the second network side device P2 according to the transmission mode information, the downlink information that is sent by the second network side device P2 to the terminal UE1 in the second time period.

For the second network side device P2, the transmission mode information is further used to instruct the second network side device P2 to receive the downlink information that is sent by the first network side device P1, and sent by the second network side device P2 to the terminal UE1 in the second time period, and the second network side device P2 is further configured to execute the following method.

The second network side device P2 receives, according to the transmission mode information, the downlink information that is sent by the first network side device P1, and sent by the second network side device P2 to the terminal UE1 in the second time period.

In the embodiment shown in FIG. 6(b), because the first network side device P1 performs full-duplex communication, the first network side device P1 is a source network side device, the second network side device P2 is a relay network side device, and the second network side device P2 assists the first network side device P1 in sending the downlink information to the terminal UE1. In the embodiment shown in FIG. 6(c), because the second network side device P2 performs full-duplex communication, the second network side device P2 is a source network side device, the first network side device P1 is a relay network side device, and the first network side device P1 assists the second network side device P2 in receiving the uplink information sent by the terminal UE1.

In addition, as shown in FIG. 6(d), the first network side device P1 and the second network side device P2 may coordinate with each other, that is, transmission modes shown in FIG. 6(b) and FIG. 6(c) are simultaneously used. Uplink data transmission is performed between the first network side device P1 and the terminal UE1, and downlink data transmission is performed between the second network side device P2 and the UE1; and the first network side device P1 sends, to the second network side device P2 according to the transmission mode information, the uplink information that is sent by the terminal UE1 and is received in the first time period, and sends, to the second network side device P2 according to the transmission mode information, the downlink information that is sent by the second network side device P2 to the terminal UE1 in the second time period.

The following describes in detail methods for obtaining the transmission mode information by the first network side device and the second network side device in the foregoing embodiments. In the methods, provided in this embodiment of the present application, for obtaining the transmission mode information by the first network side device and the second network side device, the first network side device first needs to obtain first terminal status information, and the second network side device first needs to obtain second terminal status information. Therefore, optionally, the terminal further performs the following steps.

Before the terminal sends the uplink information to the first network side device in the first time period, the terminal obtains the first terminal status information, where the first terminal status information includes a first buffer status of the terminal and information indicating that the terminal supports full-duplex communication, and the first buffer status is used to represent a buffer space that is allocated by the terminal for performing data transmission with the first network side device.

The terminal sends the first terminal status information to the first network side device.

Before the terminal sends uplink information to the second network side device in the second time period, the terminal obtains the second terminal status information, where the second terminal status information includes a second buffer status of the terminal and information indicating that the terminal supports full-duplex communication, and the second buffer status is used to represent a buffer space that is allocated by the terminal for performing data transmission with the second network side device The terminal sends the second terminal status information to the second network side device.

The first buffer status included in the first terminal status information is used to represent the buffer space that is allocated by the terminal for performing data transmission with the first network side device. Specifically, when the terminal performs uplink transmission with the first network side device, the buffer space is a buffer space that is allocated by the terminal for performing uplink transmission with the first network side device; when the terminal performs downlink transmission with the first network side device, the buffer space is a buffer space that is allocated by the terminal for performing downlink transmission with the first network side device.

The second buffer status included in the second terminal status information is used to represent the buffer space that is allocated by the terminal for performing data transmission with the second network side device. Likewise, when the terminal performs uplink transmission with the second network side device, the buffer space is a buffer space that is allocated by the terminal for performing uplink transmission with the second network side device; when the terminal performs downlink transmission with the second network side device, the buffer space is a buffer space that is allocated by the terminal for performing downlink transmission with the second network side device.

Whether the terminal supports full-duplex communication depends on a hardware capability of the terminal and a state of a channel between the terminal and a network side device. When the hardware capability of the terminal does not support full-duplex communication or the state of the channel between the terminal and the network side device is quite poor, the terminal communicates with the network side device in a conventional manner. For example, as shown in FIG. 2, when the terminal UE1 detects that a state of the channel $H_{P1,UE}$ from the first network side device P1 to the UE1 is quite poor, the terminal determines that full-duplex communication is not supported. If the hardware capability of the terminal supports full-duplex communication and the state of the channel between the terminal and the network side device is good enough to support full-duplex communication, the terminal generates information indicating that full-duplex communication is supported.

Specifically, this embodiment of the present application provides four methods for obtaining the transmission mode information by the first network side device and the second network side device.

Figure 7:
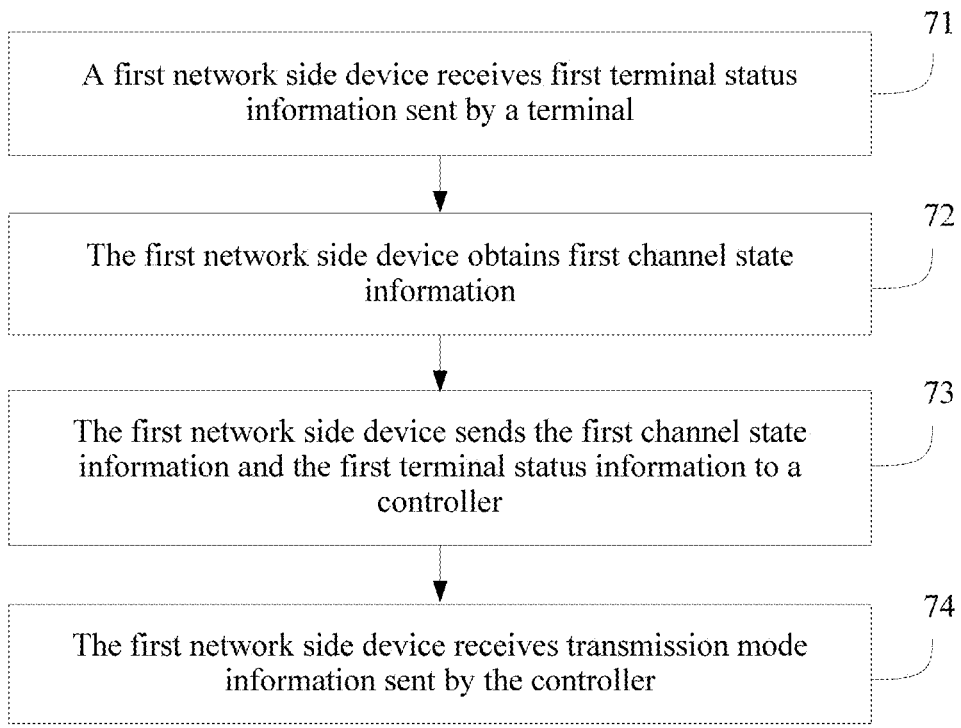
FIG. 7 is a schematic flowchart of yet another wireless communication method according to an embodiment of the present application.

Method 1: The high-frequency communications system further includes a controller, and that the first network side device obtains the transmission mode information includes, as shown in FIG. 7, the following steps:

71. The first network side device receives first terminal status information sent by the terminal, where the first terminal status information includes a first buffer status of the terminal and information indicating that the terminal supports full-duplex communication, and the first buffer status is used to represent a buffer space that is allocated by the terminal for performing data transmission with the first network side device.

72. The first network side device obtains first channel state information, where the first channel state information includes state information of a channel from the first network side device to the terminal and state information of a channel from the terminal to the first network side device.

73. The first network side device sends the first channel state information and the first terminal status information to the controller, so that the controller configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, the second channel state information includes state information of a channel from the second network side device to the terminal and state information of a channel from the terminal to the second network side device, and the second buffer status is used to represent a buffer space that is allocated by the terminal for performing data transmission with the second network side device.

74. The first network side device receives the transmission mode information sent by the controller.

In step 72, the first network side device may measure the state of the channel from the terminal to the first network side device by receiving the uplink information sent by the terminal.

If the first network side device communicates with the terminal in a time division duplex mode, the state of the channel from the first network side device to the terminal is the same as the state of the channel from the terminal to the first network side device. Therefore, the first network side device only needs to measure the state of the channel from the terminal to the first network side device by using the uplink information sent by the terminal, to obtain the state of the channel from the first network side device to the terminal, that is, the network side device can obtain the first channel state information by means of measurement.

If the first network side device communicates with the terminal in a frequency division duplex mode, the state of the channel from the terminal to the first network side device is different from the state of the channel from the first network side device to the terminal. Therefore, if the first network side device needs to obtain the first channel state information, the terminal needs to report the state information of the channel from the first network side device to the terminal, and the terminal should further perform the following steps.

The terminal obtains the state information of the channel from the first network side device to the terminal.

The terminal sends, to the first network side device, the state information of the channel from the first network side device to the terminal.

The terminal may obtain the state information of the channel from the first network side device to the terminal by measuring the downlink information sent by the first network side device.

Correspondingly, the first network side device should further perform the following steps.

The first network side device receives the state information of the channel from the first network side device to the terminal sent by the terminal.

The first network side device obtains the first channel state information by receiving the state information of the channel from the first network side device to the terminal sent by the terminal, and measuring the uplink information sent by the terminal.

In step 73, the controller configures the transmission mode information by using the first terminal status information, the first channel state information, the second terminal status information, and the second channel state information that are received. For example, if the state of the channel from the terminal to the first network side device is better than the state of the channel from the terminal to the second network side device, and the state of the channel from the second network side device to the terminal is better than the state of the channel from the first network side device to the terminal, performing uplink transmission between the terminal and the first network side device and performing downlink transmission between the terminal and the second network side device are selected. The first buffer status included in the first terminal status information is used to represent the buffer space that is allocated by the terminal for performing data transmission with the first network side device, and the second buffer status included in the second terminal status information is used to represent the buffer space that is allocated by the terminal for performing data transmission with the second network side device. When the buffer space that is allocated by the terminal for performing data transmission with the second network side device is fuller than the buffer space that is allocated by the terminal for performing data transmission with the first network side device, the transmission mode shown in FIG. 6(*b*) is configured, and there is relatively large idle space in the buffer space that is allocated by the terminal for performing data transmission with the first network side device. Therefore, the first network side device may assist the second network side device in receiving the uplink information sent by the terminal. When the buffer space that is allocated by the terminal for performing data transmission with the first network side device is fuller than the buffer space that is allocated by the terminal for performing data transmission with the second network side device, the transmission mode shown in FIG. 6(*c*) is configured, and there is relatively large idle space in the buffer space that is allocated by the terminal for performing data transmission with the second network side device. Therefore, the second network side device may assist the first network side device in sending the downlink information to the terminal. When the first network side device does not need to transmit downlink data, the transmission mode shown in FIG. 6(*a*) may be configured, and no data transmission is performed between the first network side device and the second network side device. Alternatively, when there is relatively large idle space in both the buffer space that is allocated by the terminal for performing data transmission with the first network side device and the buffer space that is allocated by the terminal for performing data transmission with the second network side device, a transmission mode shown in FIG. 6(*d*) may be configured, and the first network side device and the second network side device coordinate with each other.

Figure 8:
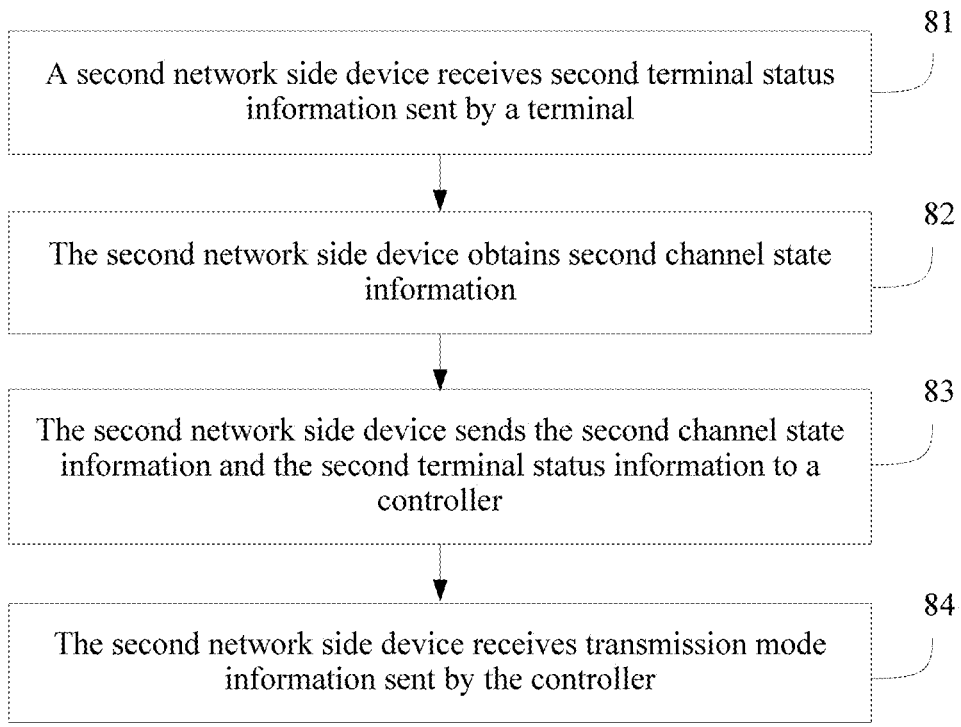
FIG. 8 is a schematic flowchart of still yet another wireless communication method according to an embodiment of the present application.

Likewise, for the method for obtaining the transmission mode information by the second network device, reference may be made to the method for obtaining the transmission mode information by the first network device in the foregoing steps 71 to 74. Specifically, as shown in FIG. 8, the second network device correspondingly performs the following steps:

81. The second network side device receives second terminal status information sent by the terminal, where the second terminal status information includes a second buffer status of the terminal and information indicating that the terminal supports full-duplex communication, and the second buffer status is used to represent a buffer space that is allocated by the terminal for performing data transmission with the second network side device.

82. The second network side device obtains second channel state information, where the second channel state information includes state information of a channel from the second network side device to the terminal and state information of a channel from the terminal to the second network side device.

83. The second network side device sends the second channel state information and the second terminal status information to the controller, so that the controller configures the transmission mode information according to the second terminal status information, the second channel state information, first terminal status information, and first terminal status information, and sends the transmission mode information to the second network side device, where the first terminal status information includes a first buffer status of the terminal and the information indicating that the terminal supports full-duplex communication, the first channel state information includes state information of a channel from the first network side device to the terminal and state information of a channel from the terminal to the first network side device, and the first buffer status is used to represent a buffer space that is allocated by the terminal for performing data transmission with the first network side device.

84. The second network side device receives the transmission mode information sent by the controller.

In step 82, the second network side device may measure the state of the channel from the terminal to the second network side device by receiving the uplink information sent by the terminal.

Likewise, if the second network side device communicates with the terminal in a time division duplex mode, the state of the channel from the second network side device to the terminal is the same as the state of the channel from the terminal to the second network side device. Therefore, the second network side device only needs to measure the state of the channel from the terminal to the second network side device by using the uplink information sent by the terminal, to obtain the state of the channel from the second network side device to the terminal, that is, the network side device can obtain the second channel state information by means of measurement.

If the second network side device communicates with the terminal in a frequency division duplex mode, the state of the channel from the terminal to the second network side device is different from the state of the channel from the second network side device to the terminal. Therefore, if the second network side device needs to obtain the second channel state information, the terminal needs to report the state information of the channel from the second network side device to the terminal, and the terminal should further perform the following steps.

The terminal obtains the state information of the channel from the second network side device to the terminal.

The terminal sends, to the second network side device, the state information of the channel from the second network side device to the terminal.

The terminal may obtain the state information of the channel from the second network side device to the terminal by measuring the downlink information sent by the first network side device.

Correspondingly, the second network side device should further perform the following steps.

The second network side device receives the state information of the channel from the second network side device to the terminal sent by the terminal.

The second network side device obtains the second channel state information by receiving the state information of the channel from the second network side device to the terminal sent by the terminal, and measuring the uplink information sent by the terminal.

Figure 9:
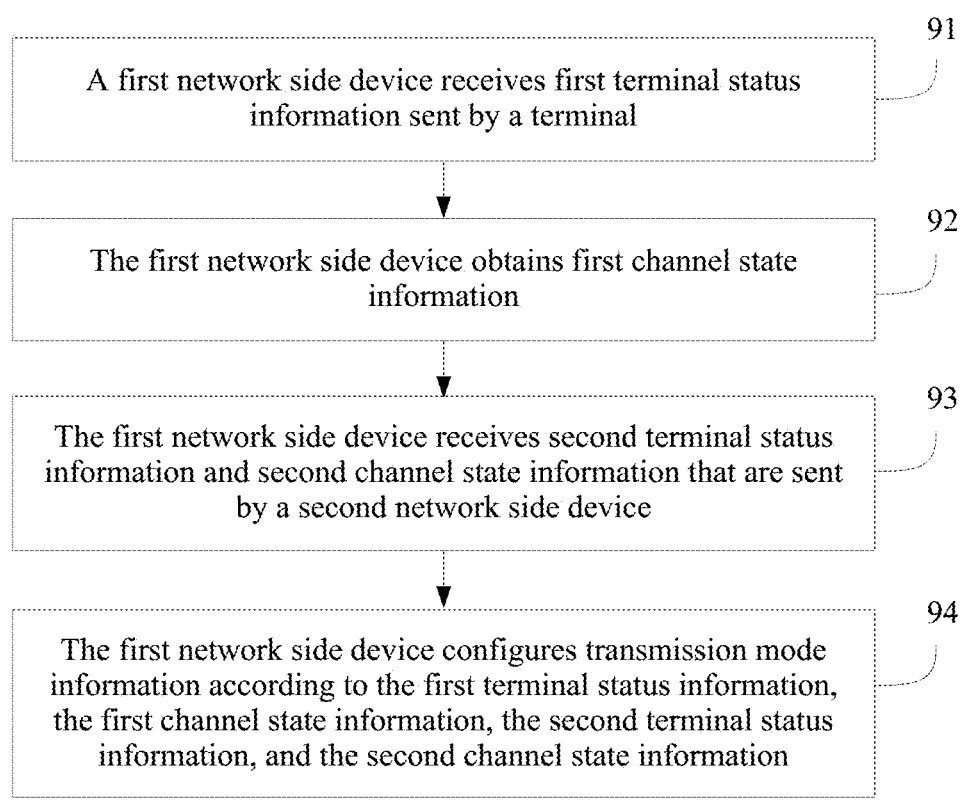
FIG. 9 is a schematic flowchart of a further wireless communication method according to an embodiment of the present application.

Method 2: The first network side device obtains the transmission mode information by performing, as shown in FIG. 9, the following steps.

91. The first network side device receives first terminal status information sent by the terminal, where the first terminal status information includes a first buffer status of the terminal and information indicating that the terminal supports full-duplex communication, and the first buffer status is used to represent a buffer space that is allocated by the terminal for performing data transmission with the first network side device.

92. The first network side device obtains first channel state information, where the first channel state information includes state information of a channel from the first network side device to the terminal and state information of a channel from the terminal to the first network side device.

93. The first network side device receives second terminal status information and second channel state information that are sent by the second network side device, where the second terminal status information includes a second buffer status of the terminal and the information indicating that the terminal supports full-duplex communication, the second channel state information includes state information of a channel from the second network side device to the terminal and state information of a channel from the terminal to the second network side device, and the second buffer status is used to represent a buffer space that is allocated by the terminal for performing data transmission with the second network side device 94. The first network side device configures the transmission mode information according to the first terminal status information, the first channel state information, the second terminal status information, and the second channel state information.

Figure 10:
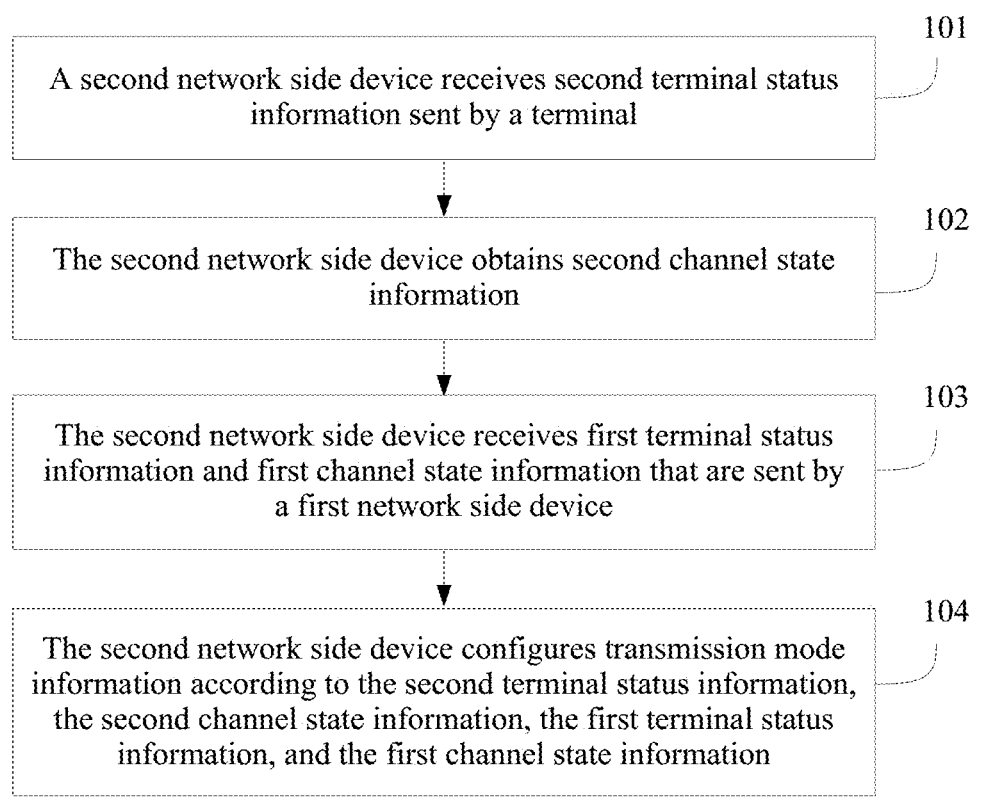
FIG. 10 is a schematic flowchart of a still further wireless communication method according to an embodiment of the present application.

Likewise, for the method for obtaining the transmission mode information by the second network device, reference may be made to the method for obtaining the transmission mode information by the first network device in the foregoing steps 91 to 94. Specifically, as shown in FIG. 10, the second network device correspondingly performs the following steps:

101. The second network side device receives second terminal status information sent by the terminal, where the second terminal status information includes a second buffer status of the terminal and information indicating that the terminal supports full-duplex communication, and the second buffer status is used to represent a buffer space that is allocated by the terminal for performing data transmission with the second network side device.

102. The second network side device obtains second channel state information, where the second channel state information includes state information of a channel from the second network side device to the terminal and state information of a channel from the terminal to the second network side device.

103. The second network side device receives first terminal status information and first channel state information that are sent by the first network side device, where the first terminal status information includes a first buffer status of the terminal and the information indicating that the terminal supports full-duplex communication, the first channel state information includes state information of a channel from the first network side device to the terminal and state information of a channel from the terminal to the first network side device, and the first buffer status is used to represent a buffer space that is allocated by the terminal for performing data transmission with the first network side device.

104. The second network side device configures the transmission mode information according to the second terminal status information, the second channel state information, the first terminal status information, and the first channel state information.

A manner of obtaining the first channel state information by the first network side device in step 92 is similar to that in step 72, and a manner of obtaining the second channel state information by the second network side device in step 102 is similar to that in step 82. Details are not repeatedly described herein in this specification.

In addition, a manner of configuring the transmission mode information by the first network side device according to the first terminal status information, the first channel state information, the second terminal status information, and the second channel state information in step 94 and a manner of configuring the transmission mode information by the second network side device according to the second terminal status information, the second channel state information, the first terminal status information, and the first channel state information in step 104 are similar to a method for configuring the transmission mode information by the controller according to the second terminal status information, the second channel state information, the first terminal status information, and the first channel state information in step 73 or step 83. Details are not repeatedly described herein in this specification.

Method 3: The first network side device is set as a primary network side device, and the second network side device is set as a secondary network side device. The first network side device performs steps 91 to 94 in the method 2, and the first network side device further performs the following step.

The first network side device sends the transmission mode information to the second network side device.

Figure 11:
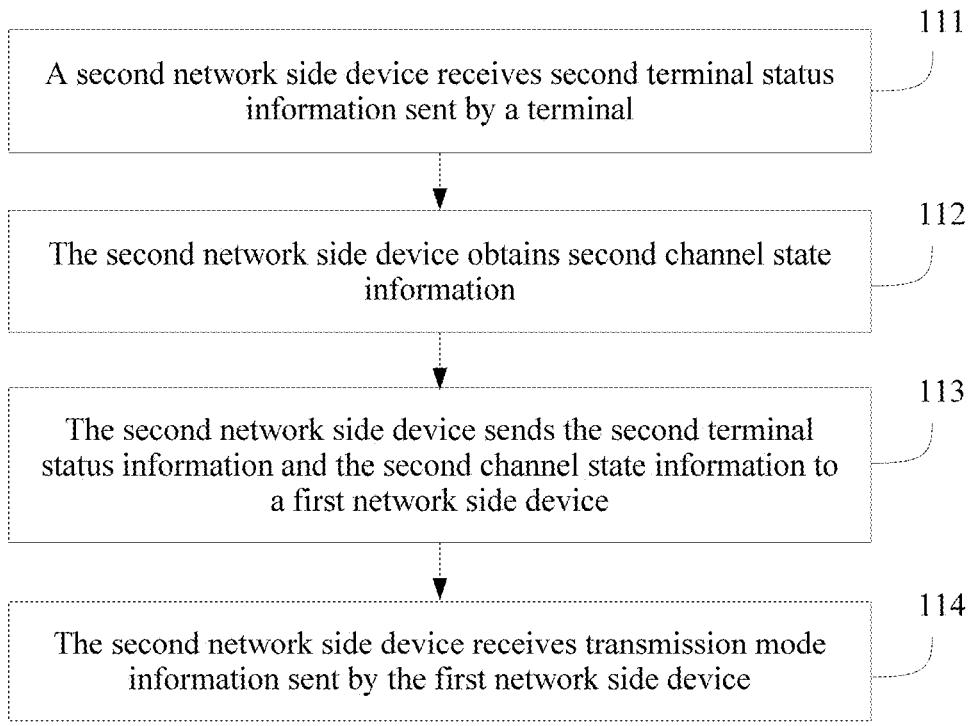
FIG. 11 is a schematic flowchart of a yet further wireless communication method according to an embodiment of the present application.

Correspondingly, the second network side device performs, as shown in FIG. 11, the following steps.

111. The second network side device receives second terminal status information sent by the terminal, where the second terminal status information includes a second buffer status of the terminal and information indicating that the terminal supports full-duplex communication, and the second buffer status is used to represent a buffer space that is allocated by the terminal for performing data transmission with the second network side device.

112. The second network side device obtains second channel state information, where the second channel state information includes state information of a channel from the second network side device to the terminal and state information of a channel from the terminal to the second network side device.

113. The second network side device sends the second terminal status information and the second channel state information to the first network side device, so that the first network side device configures the transmission mode information according to the second terminal status information, the second channel state information, first terminal status information, and first channel state information, and sends the transmission mode information to the second network side device, where the first terminal status information includes a first buffer status of the terminal and the information indicating that the terminal supports full-duplex communication, the first channel state information includes state information of a channel from the first network side device to the terminal and state information of a channel from the terminal to the first network side device, and the first buffer status is used to represent a buffer space that is allocated by the terminal for performing data transmission with the first network side device.

114. The second network side device receives the transmission mode information sent by the first network side device.

A manner of obtaining the second channel state information by the second network side device in step 112 is similar to that in step 82, and details are not repeatedly described herein in this specification.

In addition, a method for configuring the transmission mode information by the first network side device according to the first terminal status information, the first channel state information, the second terminal status information, and the second channel state information in step 113 is similar to that for configuring the transmission mode information by the controller according to the second terminal status information, the second channel state information, the first terminal status information, and the first channel state information in step 73 or step 83, and details are not repeatedly described herein in this specification.

Method 4: The second network side device is set as a primary network side device, and the first network side device is set as a secondary network side device. The second network side device performs steps 101 to 104 in the method 2, and the second network side device further performs the following step.

The second network side device sends the transmission mode information to the first network side device.

Figure 12:
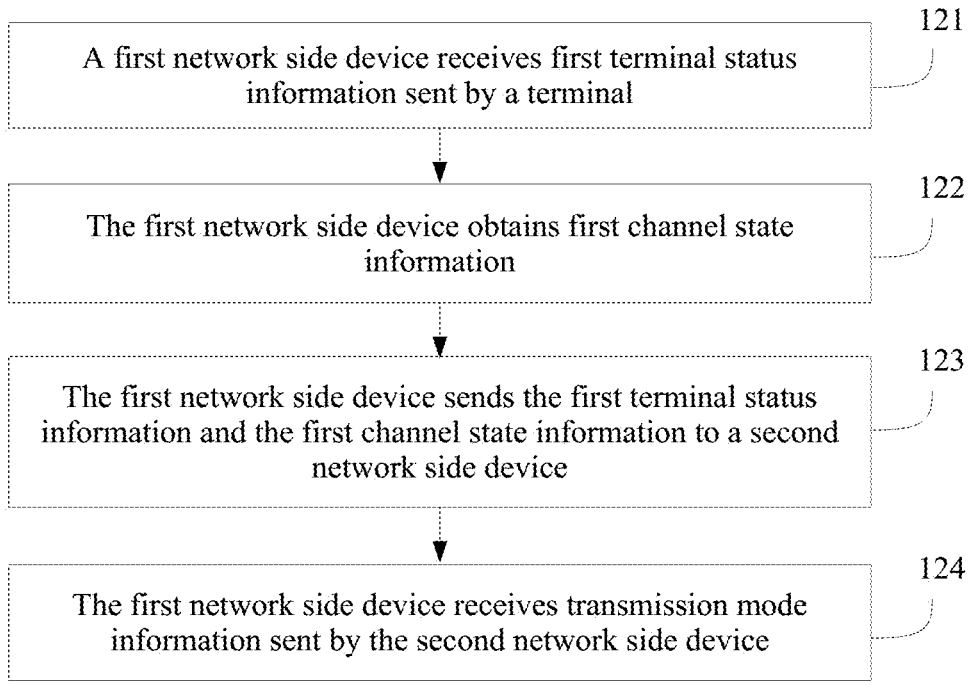
FIG. 12 is a schematic flowchart of a still yet further wireless communication method according to an embodiment of the present application.

Correspondingly, the first network side device performs, as shown in FIG. 12, the following steps.

121. The first network side device receives first terminal status information sent by the terminal, where the first terminal status information includes a first buffer status of the terminal and information indicating that the terminal supports full-duplex communication, and the first buffer status is used to represent a buffer space that is allocated by the terminal for performing data transmission with the first network side device.

122. The first network side device obtains first channel state information, where the first channel state information includes state information of a channel from the first network side device to the terminal and state information of a channel from the terminal to the first network side device.

123. The first network side device sends the first terminal status information and the first channel state information to the second network side device, so that the second network side device configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, the second channel state information includes state information of a channel from the second network side device to the terminal and state information of a channel from the terminal to the second network side device, and the second buffer status is used to represent a buffer space that is allocated by the terminal for performing data transmission with the second network side device.

124. The first network side device receives the transmission mode information sent by the second network side device.

A manner of obtaining the first channel state information by the first network side device in step 122 is similar to that in step 72, and details are not repeatedly described herein in this specification.

In addition, a method for configuring the transmission mode information by the second network side device according to the first terminal status information, the first channel state information, the second terminal status information, and the second channel state information in step 123 is similar to that for configuring the transmission mode information by the controller according to the second terminal status information, the second channel state information, the first terminal status information, and the first channel state information in step 73 or step 83, and details are not repeatedly described herein in this specification.

In addition, any one of the foregoing embodiments may be further applied to a scenario in which a terminal located in an overlap area of multiple cells communicates with a network side device, where the multiple cells refer to more than two cells, for example, three, four, or more cells. For a method for communicating, by a terminal, with multiple network side devices corresponding to multiple cells, reference may be made to the method for communicating with the first network side device and the second network side device by the terminal in the foregoing embodiments, and details are not repeatedly described herein in this specification.

Figure 13:
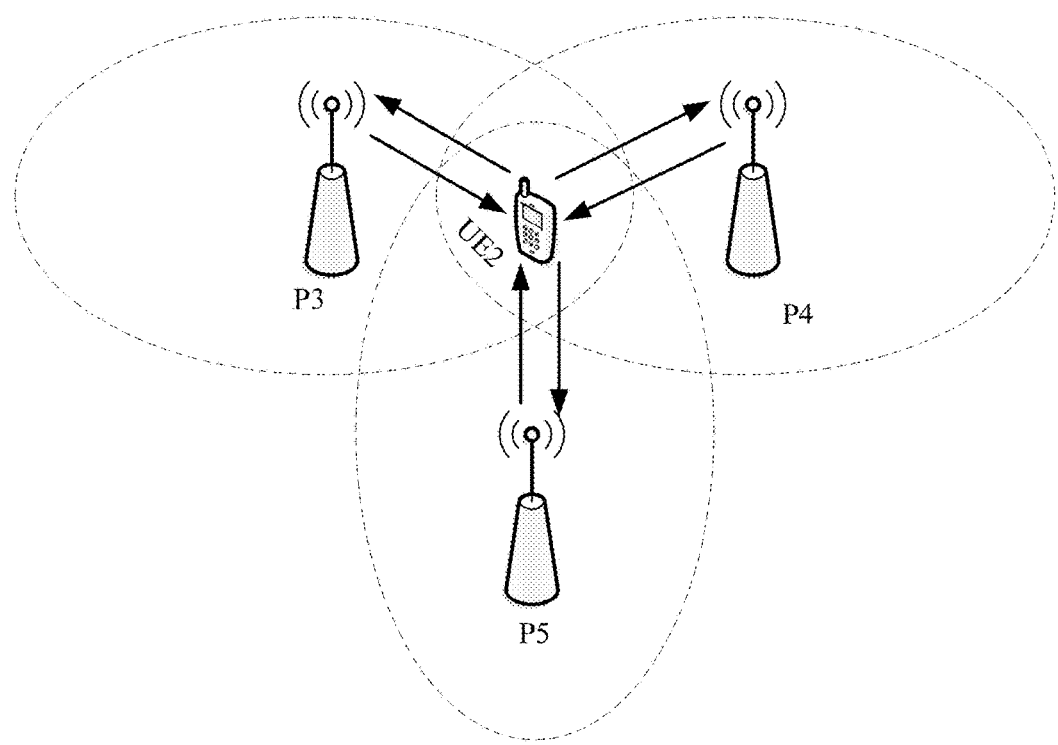
FIG. 13 is a schematic structural diagram of another high-frequency communications system according to an embodiment of the present application.

In addition, when a terminal is located in an overlap area of multiple cells whose quantity is more than 2, the embodiments of the present application may also be applied to communication performed between the terminal and a network side device, for example, the terminal is located in an overlap area of three, four, or more cells. As shown in FIG. 13, a terminal UE2 is located in an overlap area of a third cell corresponding to a network side device P3, a fourth cell corresponding to a network side device P4, and a fifth cell corresponding to a network side device P5. For a data transmission method between the terminal UE2 and any two network side devices, reference may be made to the data transmission method between the terminal and the first network side device and the second network side device in any one of the foregoing embodiments.

For example, if P3, P4, and P5 are all network side devices, a high-frequency communications system shown in FIG. 13 further includes a controller, and P3, P4, and P5 all perform communication in a time division duplex mode, P3 sends third channel state information and third terminal status information to the controller, P4 sends fourth channel state information and fourth terminal status information to the controller, P5 sends fifth channel state information and fifth terminal status information to the controller, and the controller configures transmission mode information according to the third channel state information, the third terminal status information, the fourth channel state information, the fourth terminal status information, the fifth channel state information, and the fifth terminal status information. For example, if a state of a channel from the UE2 to P3 is better than a state of a channel from the UE2 to P4, and the state of the channel from the UE2 to P4 is better than a state of a channel from the UE2 to P5, performing uplink transmission between P3 and the UE2, performing downlink transmission between P4 and the UE2, and performing downlink transmission between P5 and the UE2 are configured. A third buffer status included in the third terminal status information is used to represent a buffer space that is allocated by the UE2 for performing data transmission with P3, a fourth buffer status included in the fourth terminal status information is used to represent a buffer space that is allocated by the UE2 for performing data transmission with P4, and a fifth buffer status included in the fifth terminal status information is used to represent a buffer space that is allocated by the UE2 for performing data transmission with P5. When the buffer space that is allocated by the UE2 for performing data transmission with P3 is fuller than the buffer space that is allocated by the UE2 for performing data transmission with P4, the buffer space that is allocated by the UE2 for performing data transmission with P3 is fuller than the buffer space that is allocated by the UE2 for performing data transmission with P5, and the third network side device P3 needs to send downlink data to the terminal UE2, the transmission mode shown in FIG. 6(*b*) is configured for the UE2, P3, and P4, and the transmission mode shown in FIG. 6(*b*) is also configured for the UE2, P3, and P5. When the buffer space that is allocated by the UE2 for performing data transmission with P3 is fuller than the buffer space that is allocated by the UE2 for performing data transmission with P4, and the buffer space that is allocated by the UE2 for performing data transmission with P3 is fuller than the buffer space that is allocated by the UE2 for performing data transmission with P5, but the third network side device P3 does not need to send downlink data, the transmission mode shown in FIG. 6(*a*) is configured for the UE2, P3, and P4, and the transmission mode shown in FIG. 6(*a*) is also configured for the UE2, P3, and P5. According to the foregoing embodiments, inter-cell interference between the third cell corresponding to P3 and the fourth cell corresponding to P4 can be avoided, and inter-cell interference between the third cell corresponding to P3 and the fifth cell corresponding to P5 can also be avoided.

An embodiment of the present application provides a terminal 140 to execute the data transmission method implemented by the terminal in the foregoing method embodiments, and the terminal is applied to the high-frequency communications system shown in FIG. 2, that is, a high-frequency communications system that includes at least one terminal UE1 and at least two network side devices. The at least two network side devices include a first network side device P1 and a second network side device P2, a first cell corresponding to the first network side device P1 is adjacent to a second cell corresponding to the second network side device P2, and the at least one terminal UE1 is located in an overlap area of the first cell and the second cell.

Figure 14:
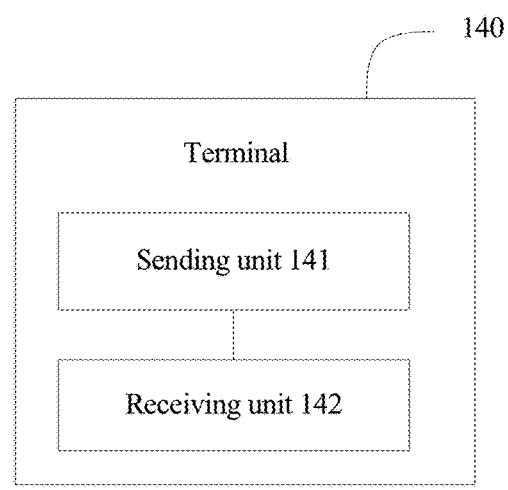
FIG. 14 is a schematic structural diagram of a terminal according to an embodiment of the present application.

As shown in FIG. 14, the terminal includes: a sending unit 141, configured to send uplink information to the first network side device in a first time period; and a receiving unit 142, configured to receive, in a second time period, downlink information sent by the second network side device.

The first time period and the second time period are a same time period.

Figure 15:
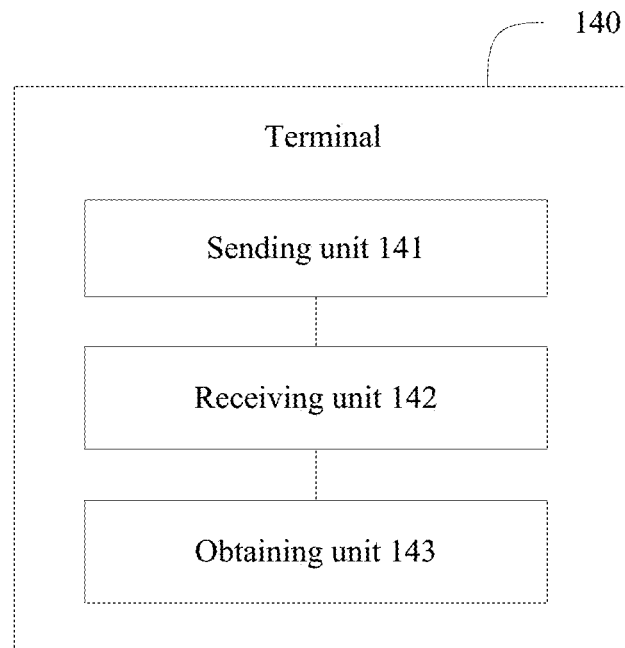
FIG. 15 is a schematic structural diagram of another terminal according to an embodiment of the present application.

Further, optionally, as shown in FIG. 15, the terminal further includes: an obtaining unit 143, configured to obtain first terminal status information, where the first terminal status information includes a first buffer status of the terminal and information indicating that the terminal supports full-duplex communication.

The sending unit 141 is further configured to: receive the first terminal status information from the obtaining unit 143, and send the first terminal status information to the first network side device.

Further, optionally, as shown in FIG. 15, the terminal further includes: an obtaining unit 143, configured to obtain second terminal status information, where the second terminal status information includes a second buffer status of the terminal and information indicating that the terminal supports full-duplex communication.

The sending unit 141 is further configured to: receive the second terminal status information from the obtaining unit 143, and send the second terminal status information to the second network side device.

When the terminal in this embodiment of the present application is located in an overlap area of a first cell and a second cell, only one network side device sends downlink information to the terminal in a same time period because the terminal performs uplink information transmission with a first network side device in a first time period, the terminal performs downlink information transmission with a second network side device in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

An embodiment of the present application provides a first network side device 16o to execute the data transmission method implemented by the first network side device in the foregoing embodiments, and the network side device is applied to the high-frequency communications system shown in FIG. 2, that is, a high-frequency communications system that includes at least one terminal UE1 and at least two network side devices. The at least two network side devices include the first network side device P1 and a second network side device P2, a first cell corresponding to the first network side device P1 is adjacent to a second cell corresponding to the second network side device P2, and the at least one terminal UE1 is located in an overlap area of the first cell and the second cell. The second network side device P2 sends downlink information to the terminal UE1 in a second time period.

Figure 16:
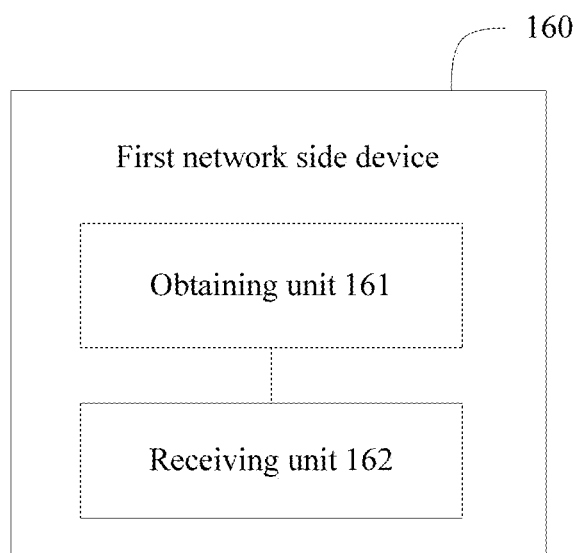
FIG. 16 is a schematic structural diagram of a first network side device according to an embodiment of the present application.

As shown in FIG. 16, the first network side device 16o includes: an obtaining unit 161, configured to obtain transmission mode information, where the transmission mode information is used to instruct the first network side device to receive, in a first time period, uplink information sent by the terminal; and a receiving unit 162, configured to: receive the transmission mode information from the obtaining unit 161, and receive, according to the transmission mode information, the uplink information sent by the terminal.

The first time period and the second time period are a same time period.

Figure 17:
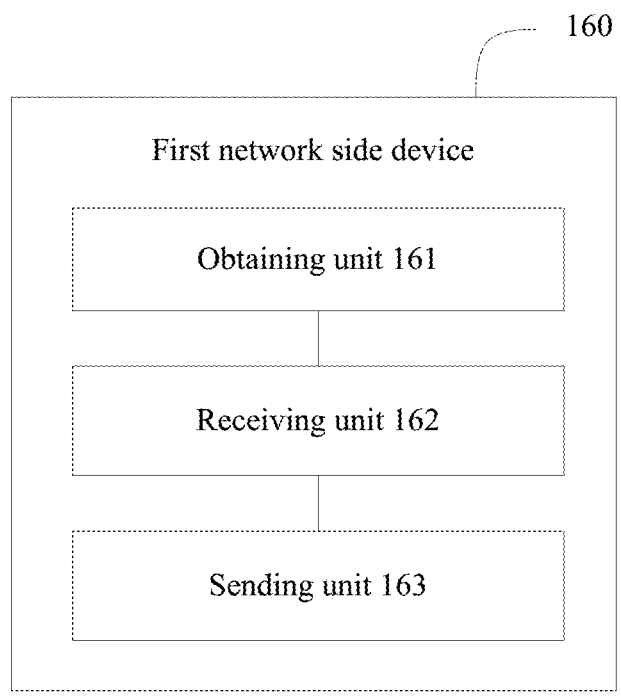
FIG. 17 is a schematic structural diagram of another first network side device according to an embodiment of the present application.

Optionally, the transmission mode information is further used to instruct the first network side device to send, to the second network side device, the uplink information that is sent by the terminal and is received in the first time period. As shown in FIG. 17, the network side device further includes: a sending unit 163, configured to: receive the transmission mode information from the obtaining unit 161, and send, to the second network side device according to the transmission mode information, the uplink information that is sent by the terminal and is received by the receiving unit in the first time period.

Still optionally, the transmission mode information is further used to instruct the first network side device to send, to the second network side device, the downlink information that is sent by the second network side device to the terminal in the second time period, and the network side device further includes: a sending unit 163, configured to: receive the transmission mode information from the obtaining unit 161, and send, to the second network side device according to the transmission mode information, the downlink information that is sent by the second network side device to the terminal in the second time period.

Figure 18:
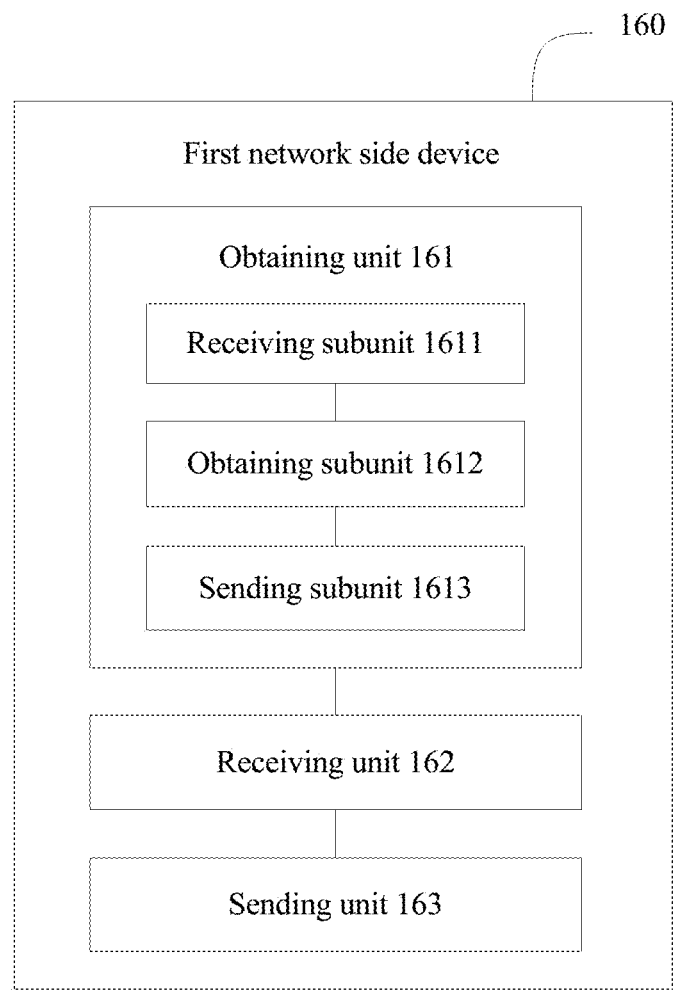
FIG. 18 is a schematic structural diagram of still another first network side device according to an embodiment of the present application.

Further, the high-frequency communications system further includes a controller, and as shown in FIG. 18, the obtaining unit 161 includes: a receiving subunit 1611, configured to receive first terminal status information sent by the terminal, where the first terminal status information includes a first buffer status of the terminal and information indicating that the terminal supports full-duplex communication; an obtaining subunit 1612, configured to obtain first channel state information, where the first channel state information includes state information of a channel from the first network side device to the terminal and state information of a channel from the terminal to the first network side device; and a sending subunit 1613, configured to: receive the first terminal status information from the receiving subunit 1611, receive the first channel state information from the obtaining subunit 1612, and send the first terminal status information and the first channel state information to the controller, so that the controller configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device.

The receiving subunit 1611 is further configured to receive the transmission mode information sent by the controller.

In the foregoing embodiment, when the first network side device communicates with the terminal in a frequency division duplex mode, the terminal includes: an obtaining unit, configured to obtain the state information of the channel from the first network side device to the terminal.

A sending unit is further configured to: receive, from the obtaining unit, the state information of the channel from the first network side device to the terminal, and send, to the first network side device, the state information of the channel from the first network side device to the terminal.

The receiving subunit 1611 of the first network side device is further configured to receive the state information of the channel from the first network side device to the terminal sent by the terminal.

Figure 19:
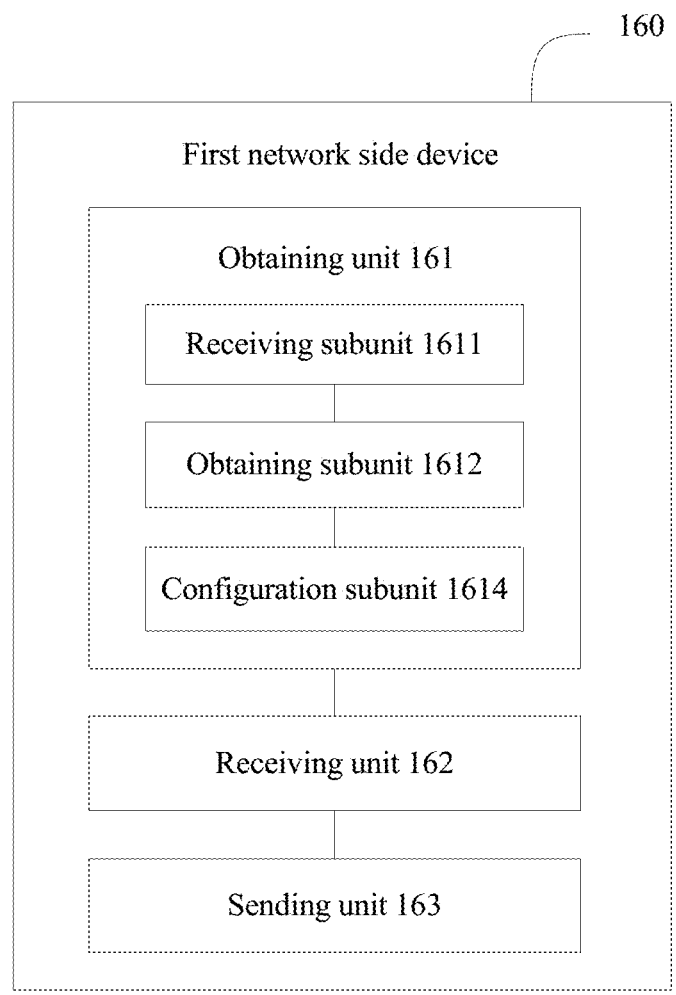
FIG. 19 is a schematic structural diagram of yet another first network side device according to an embodiment of the present application.

Optionally, as shown in FIG. 19, the obtaining unit 161 of the first network side device may include: a receiving subunit 1611, configured to receive first terminal status information sent by the terminal, where the first terminal status information includes a first buffer status of the terminal and information indicating that the terminal supports full-duplex communication; an obtaining subunit 1612, configured to obtain first channel state information, where the first channel state information includes state information of a channel from the first network side device to the terminal and state information of a channel from the terminal to the first network side device; where the receiving subunit 1611 is further configured to receive second terminal status information and second channel state information that are sent by the second network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device; and a configuration subunit 1614, configured to: receive the first terminal status information, the second terminal status information, and the second channel state information from the receiving subunit 1611, receive the first channel state information from the obtaining subunit 1612, and configure the transmission mode information according to the first terminal status information, the first channel state information, the second terminal status information, and the second channel state information.

In the foregoing embodiment, when the first network side device communicates with the terminal in a frequency division duplex mode, the terminal further includes: an obtaining unit, configured to obtain the state information of the channel from the first network side device to the terminal.

The sending unit is further configured to: receive, from the obtaining unit, the state information of the channel from the first network side device to the terminal, and send, to the first network side device, the state information of the channel from the first network side device to the terminal.

The receiving subunit 1611 of the first network side device is further configured to receive the state information of the channel from the first network side device to the terminal sent by the terminal.

Figure 20:
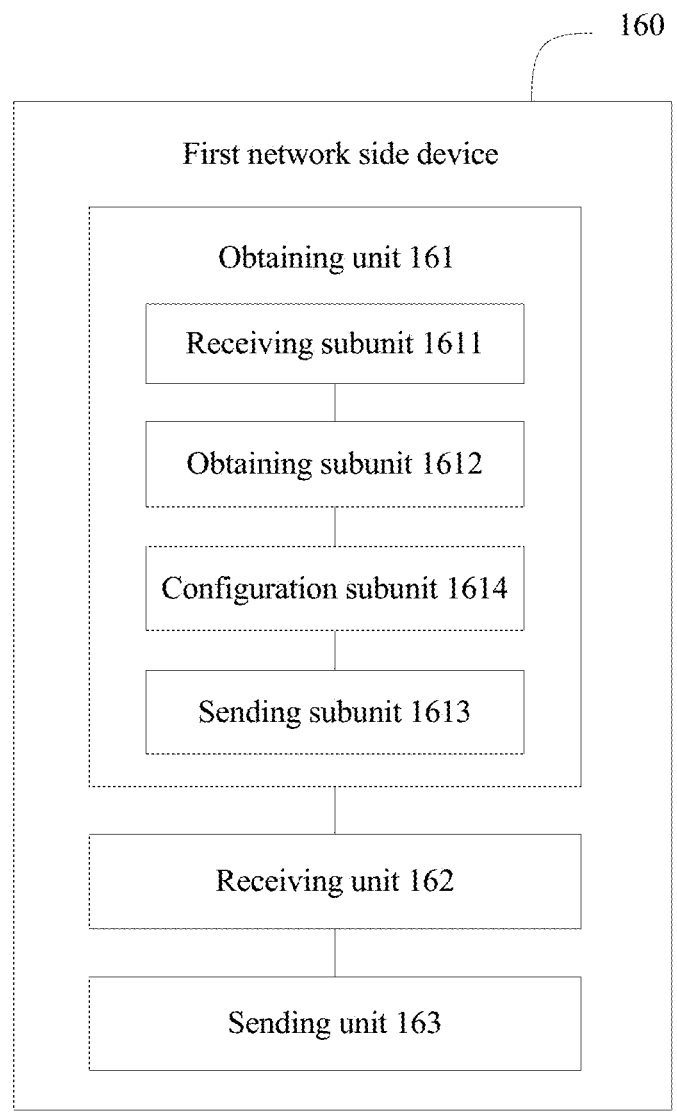
FIG. 20 is a schematic structural diagram of still yet another first network side device according to an embodiment of the present application.

Further, optionally, as shown in FIG. 20, the obtaining unit 161 further includes: a sending subunit 1613, configured to: receive the transmission mode information from the configuration subunit, and send the transmission mode information to the second network side device.

Figure 21:
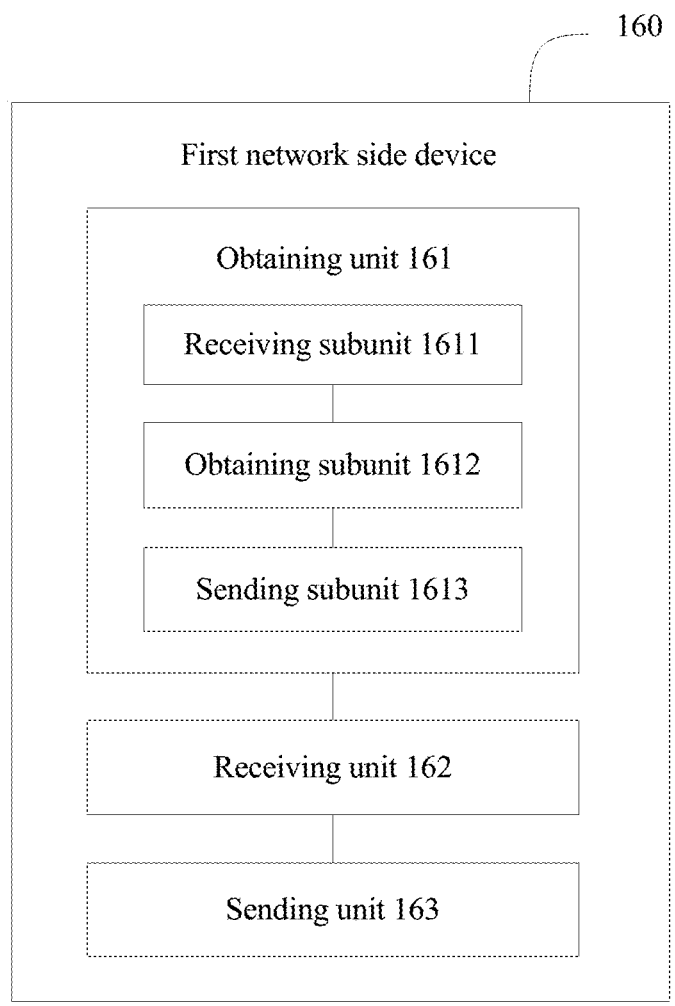
FIG. 21 is a schematic structural diagram of a further first network side device according to an embodiment of the present application.

Optionally, as shown in FIG. 21, the obtaining unit 161 of the first network side device may include: a receiving subunit 1611, configured to receive first terminal status information sent by the terminal, where the first terminal status information includes a first buffer status of the terminal and information indicating that the terminal supports full-duplex communication; an obtaining subunit 1612, configured to obtain first channel state information, where the first channel state information includes state information of a channel from the first network side device to the terminal and state information of a channel from the terminal to the first network side device; and a sending subunit 1613, configured to: receive the first terminal status information from the receiving subunit, receive the first channel state information from the obtaining subunit, and send the first terminal status information and the first channel state information to the second network side device, so that the second network side device configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device.

The receiving subunit is further configured to receive the transmission mode information sent by the second network side device.

In the foregoing embodiment, when the first network side device communicates with the terminal in a frequency division duplex mode, the terminal further includes: an obtaining unit, configured to obtain the state information of the channel from the first network side device to the terminal.

The sending unit is further configured to: receive, from the obtaining unit, the state information of the channel from the first network side device to the terminal, and send, to the first network side device, the state information of the channel from the first network side device to the terminal.

The receiving subunit 1611 of the first network side device is further configured to receive the state information of the channel from the first network side device to the terminal sent by the terminal.

In the foregoing embodiment, when a terminal is located in an overlap area of a first cell and a second cell, only one network side device sends downlink information to the terminal in a same time period because a first network side device performs uplink information transmission with the terminal in a first time period, a second network side device performs downlink information transmission with the terminal in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

Another embodiment of the present application provides a second network side device 220 to execute the data transmission method implemented by the second network side device in the foregoing method embodiments, and the network side device is applied to the high-frequency communications system shown in FIG. 2, that is, a high-frequency communications system that includes at least one terminal UE1 and at least two network side devices. The at least two network side devices include a first network side device P1 and the second network side device P2, a first cell corresponding to the first network side device P1 is adjacent to a second cell corresponding to the second network side device P2, and the at least one terminal UE1 is located in an overlap area of the first cell and the second cell. The first network side device receives, in a first time period, uplink information sent by the terminal.

Figure 22:
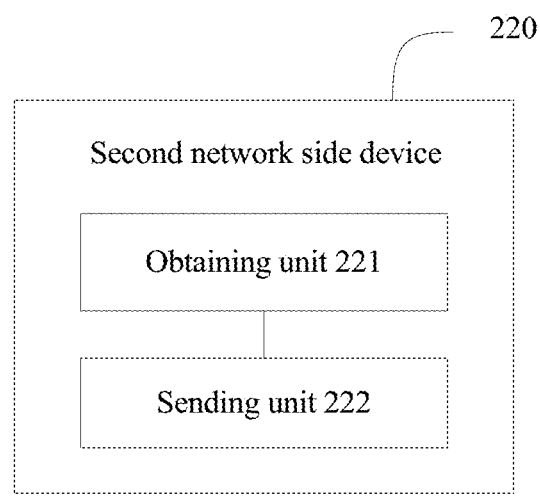
FIG. 22 is a schematic structural diagram of a second network side device according to an embodiment of the present application.

As shown in FIG. 22, the second network side device 220 includes: an obtaining unit 221, configured to obtain transmission mode information, where the transmission mode information is used to instruct the second network side device to send downlink information to the terminal in a second time period; and a sending unit 222, configured to: receive the transmission mode information from the obtaining unit 221, and send the downlink information to the terminal in the second time period according to the transmission mode information.

The first time period and the second time period are a same time period.

Optionally, the transmission mode information is further used to instruct the second network side device to receive the uplink information that is sent by the terminal, received by the first network side device in the first time period, and sent by the first network side device, and the network side device further includes: a receiving unit 223, configured to: receive the transmission mode information from the obtaining unit 221, and receive, according to the transmission mode information, the uplink information that is sent by the terminal, received by the first network side device in the first time period, and sent by the first network side device.

Still optionally, the transmission mode information is further used to instruct the second network side device to receive the downlink information that is sent by the first network side device, and sent by the second network side device to the terminal in the second time period, and the network side device further includes: a receiving unit 223, configured to: receive the transmission mode information from the obtaining unit 221, and receive, according to the transmission mode information, the downlink information that is sent by the first network side device, and sent by the second network side device to the terminal in the second time period.

Figure 23:
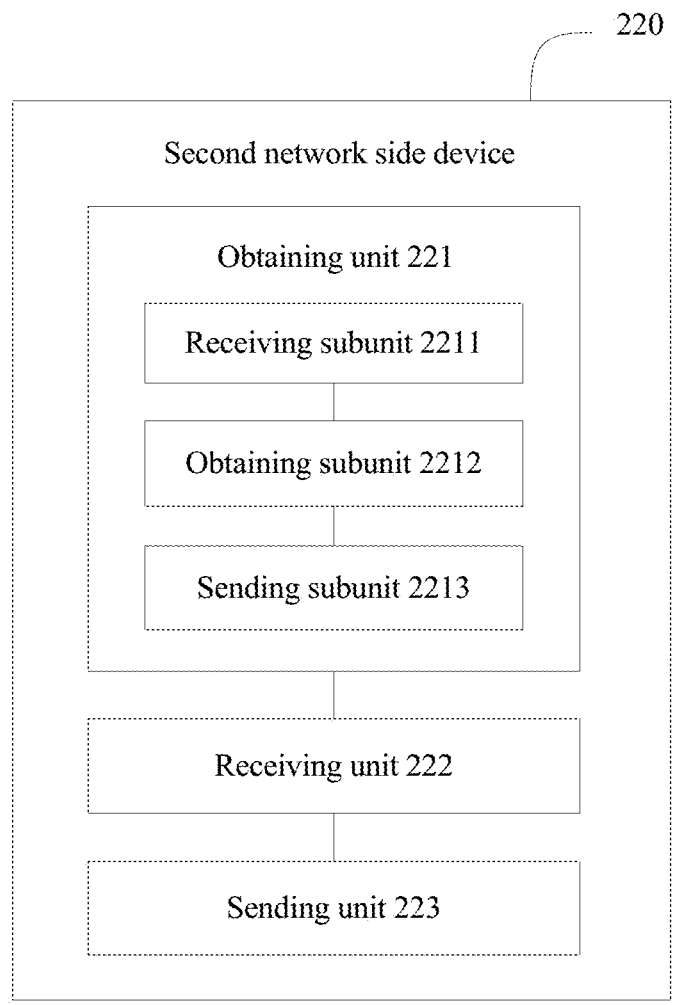
FIG. 23 is a schematic structural diagram of another second network side device according to an embodiment of the present application.

Further, the high-frequency communications system further includes a controller, and as shown in FIG. 23, the obtaining unit 221 includes: a receiving subunit 2211, configured to receive second terminal status information sent by the terminal, where the second terminal status information includes a second buffer status of the terminal and information indicating that the terminal supports full-duplex communication; an obtaining subunit 2212, configured to obtain second channel state information, where the second channel state information includes state information of a channel from the second network side device to the terminal and state information of a channel from the terminal to the second network side device; and a sending subunit 2213, configured to: receive the second terminal status information from the receiving subunit 2211, receive the second channel state information from the obtaining subunit 2212, and send the second terminal status information and the second channel state information to the controller, so that the controller configures the transmission mode information according to the second terminal status information, the second channel state information, first terminal status information, and first channel state information, and sends the transmission mode information to the second network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device.

The receiving subunit 2211 is further configured to receive the transmission mode information sent by the controller.

In the foregoing embodiment, when the second network side device communicates with the terminal in a frequency division duplex mode, the terminal further includes: an obtaining unit, configured to obtain the state information of the channel from the second network side device to the terminal.

The sending unit is further configured to: receive, from the obtaining unit, the state information of the channel from the second network side device to the terminal, and send, to the second network side device, the state information of the channel from the second network side device to the terminal.

The receiving subunit 2211 of the second network side device is further configured to receive the state information of the channel from the second network side device to the terminal sent by the terminal.

Figure 24:
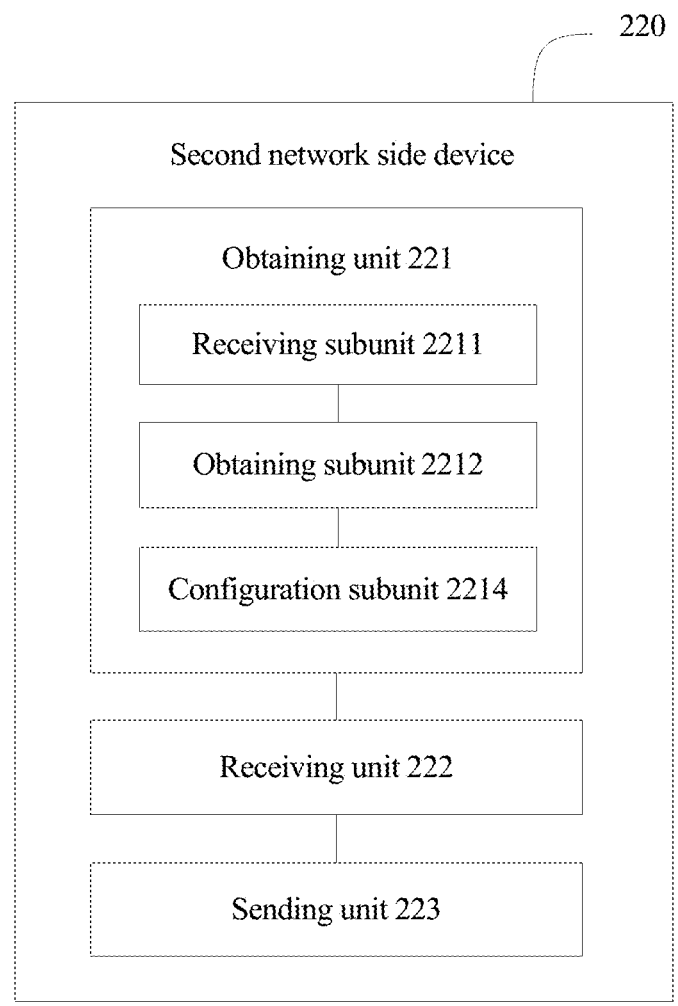
FIG. 24 is a schematic structural diagram of still another second network side device according to an embodiment of the present application.

Optionally, as shown in FIG. 24, the obtaining unit 221 of the second network side device may include: a receiving subunit 2211, configured to receive second terminal status information sent by the terminal, where the second terminal status information includes a second buffer status of the terminal and information indicating that the terminal supports full-duplex communication; an obtaining subunit 2212, configured to obtain second channel state information, where the second channel state information includes state information of a channel from the second network side device to the terminal and state information of a channel from the terminal to the second network side device; where the receiving subunit 2211 is further configured to receive first terminal status information and first channel state information that are sent by the first network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device; and a configuration subunit 2214, configured to: receive the second terminal status information, the first terminal status information, and the first channel state information from the receiving subunit 2211, receive the second channel state information from the obtaining subunit 2212, and configure the transmission mode information according to the first terminal status information, the first channel state information, the second terminal status information, and the second channel state information.

In the foregoing embodiment, when the second network side device communicates with the terminal in a frequency division duplex mode, the terminal further includes: an obtaining unit, configured to obtain the state information of the channel from the second network side device to the terminal.

The sending unit is further configured to: receive, from the obtaining unit, the state information of the channel from the second network side device to the terminal, and send, to the second network side device, the state information of the channel from the second network side device to the terminal.

The receiving subunit 2211 of the second network side device is further configured to receive the state information of the channel from the second network side device to the terminal sent by the terminal.

Further, optionally, the obtaining unit 2211 further includes: a sending subunit 2213, configured to: receive the transmission mode information from the configuration subunit, and send the transmission mode information to the first network side device.

Figure 25:
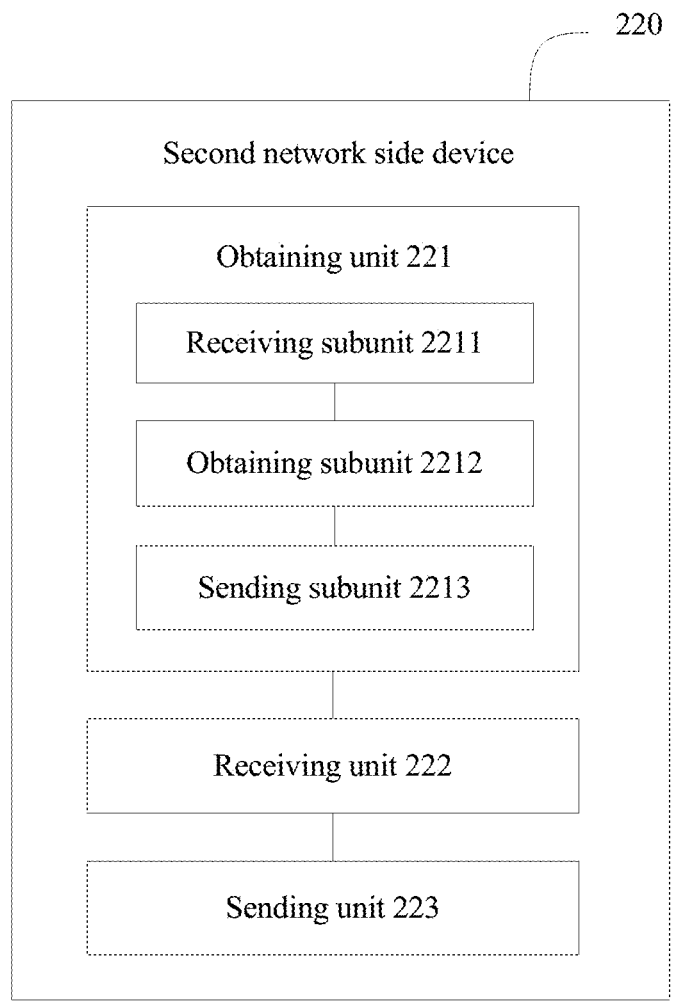
FIG. 25 is a schematic structural diagram of yet another second network side device according to an embodiment of the present application.

Optionally, as shown in FIG. 25, the obtaining unit 221 of the second network side device may include: a receiving subunit 2211, configured to receive second terminal status information sent by the terminal, where the second terminal status information includes a second buffer status of the terminal and information indicating that the terminal supports full-duplex communication; an obtaining subunit 2212, configured to obtain second channel state information, where the second channel state information includes state information of a channel from the second network side device to the terminal and state information of a channel from the terminal to the second network side device; and a sending subunit 2213, configured to: receive the second terminal status information from the receiving subunit, receive the second channel state information from the obtaining subunit, and send the second terminal status information and the second channel state information to the first network side device, so that the first network side device configures the transmission mode information according to the second terminal status information, the second channel state information, first terminal status information, and first channel state information, and sends the transmission mode information to the second network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device.

The receiving subunit is further configured to receive the transmission mode information sent by the first network side device.

In the foregoing embodiment, when the second network side device communicates with the terminal in a frequency division duplex mode, the terminal further includes: an obtaining unit, configured to obtain the state information of the channel from the second network side device to the terminal.

The sending unit is further configured to: receive, from the obtaining unit, the state information of the channel from the second network side device to the terminal, and send, to the second network side device, the state information of the channel from the second network side device to the terminal.

The receiving subunit 2211 of the second network side device is further configured to receive the state information of the channel from the second network side device to the terminal sent by the terminal.

In the foregoing embodiment, when a terminal is located in an overlap area of a first cell and a second cell, only one network side device sends downlink information to the terminal in a same time period because a second network side device performs downlink information transmission with the terminal in a second time period, a first network side device performs uplink information transmission with the terminal in a first time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

An embodiment of the present application provides a terminal 260, and the terminal 260 is applied to the high-frequency communications system shown in FIG. 2, that is, a high-frequency communications system that includes at least one terminal UE1 and at least two network side devices. The at least two network side devices include a first network side device P1 and a second network side device P2, a first cell corresponding to the first network side device P1 is adjacent to a second cell corresponding to the second network side device P2, and the at least one terminal UE1 is located in an overlap area of the first cell and the second cell.

Figure 26:
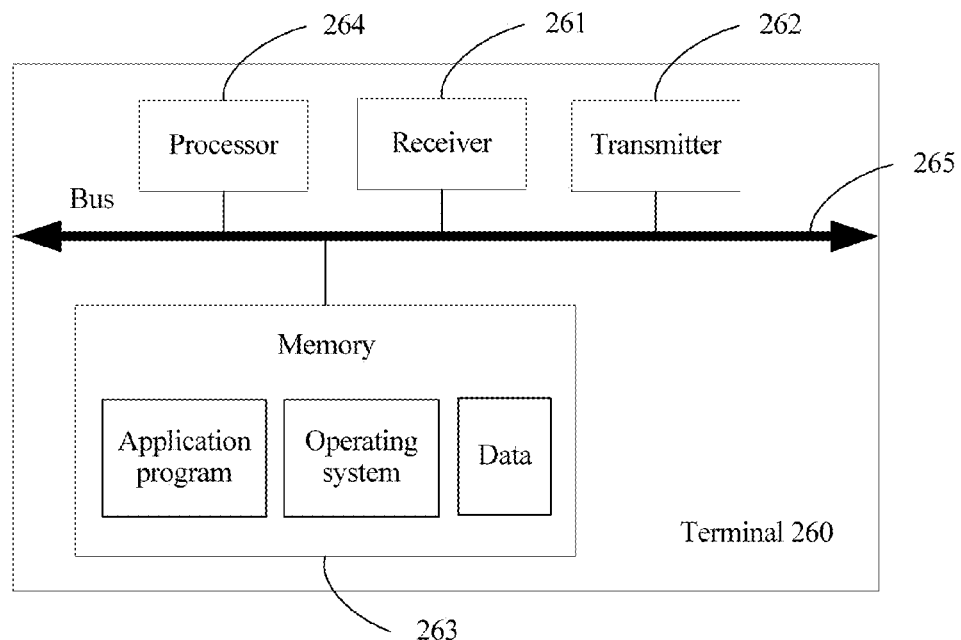
FIG. 26 is a schematic structural diagram of still another terminal according to an embodiment of the present application.

As shown in FIG. 26, the terminal 260 includes a receiver 261, a transmitter 262, a memory 263, a processor 264, and a bus 265, where the receiver 261, the transmitter 262, the memory 263, and the processor 264 are connected and implement mutual communication by using the bus 265, and the memory 263 is configured to store data processed by the processor 263.

The bus 265 may be an industry standard architecture (ISA for short) bus, a peripheral component interconnect (PCI for short) bus, an extended industry standard architecture (EISA for short) bus, or the like. This is not limited herein. The bus 265 may be classified into an address bus, a data bus, a control bus, and the like. For ease of representation, the bus 265 is represented by using only one bold line in FIG. 26, which, however, does not mean that only one bus or one type of bus exists.

The memory 263 is configured to store data or executable program code, where the program code includes a computer operation instruction and may be specifically an operating system, an application program, or the like. The memory 263 may include a high-speed RAM, or may include a non-volatile memory (English: non-volatile memory), for example, at least one magnetic disk storage.

The processor 264 may be a central processing unit (CPU for short), or an application-specific integrated circuit (ASIC for short), or one or more integrated circuits configured to implement the embodiments of the present application.

The processor 264 is configured to execute the program code in the memory 263, to implement the data transmission method in the foregoing embodiments.

The transmitter 262 is configured to send uplink information to the first network side device in a first time period.

The receiver 261 is configured to receive, in a second time period, downlink information sent by the second network side device.

The first time period and the second time period are a same time period.

Optionally, the processor 264 is configured to obtain first terminal status information, where the first terminal status information includes a first buffer status of the terminal and information indicating that the terminal supports full-duplex communication.

The transmitter 262 is further configured to: receive the first terminal status information from the processor 264, and send the first terminal status information to the first network side device.

Optionally, the terminal communicates with the first network side device in a frequency division duplex mode, the processor 264 is configured to obtain state information of a channel from the first network side device to the terminal; and the transmitter 262 is further configured to: receive, from the processor 264, the state information of the channel from the first network side device to the terminal, and send, to the first network side device, the state information of the channel from the first network side device to the terminal.

Optionally, the processor 264 is configured to obtain second terminal status information, where the second terminal status information includes a second buffer status of the terminal and information indicating that the terminal supports full-duplex communication.

The transmitter 262 is further configured to: receive the second terminal status information from the processor 264, and send the second terminal status information to the second network side device.

Optionally, the terminal communicates with the second network side device in a frequency division duplex mode; the processor 264 is configured to obtain state information of a channel from the second network side device to the terminal; and the transmitter 262 is further configured to: receive, from the processor 264, the state information of the channel from the second network side device to the terminal, and send, to the second network side device, the state information of the channel from the second network side device to the terminal.

In the foregoing embodiment, when a terminal is located in an overlap area of a first cell and a second cell, only one network side device sends downlink information to the terminal in a same time period because the terminal performs uplink information transmission with a first network side device in a first time period, the terminal performs downlink information transmission with a second network side device in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

An embodiment of the present application provides a first network side device 270, and the network side device is applied to the high-frequency communications system shown in FIG. 2, that is, a high-frequency communications system that includes at least one terminal UE1 and at least two network side devices. The at least two network side devices include the first network side device P1 and a second network side device P2, a first cell corresponding to the first network side device P1 is adjacent to a second cell corresponding to the second network side device P2, and the at least one terminal UE1 is located in an overlap area of the first cell and the second cell. The second network side device sends downlink information to the terminal in a second time period.

Figure 27:
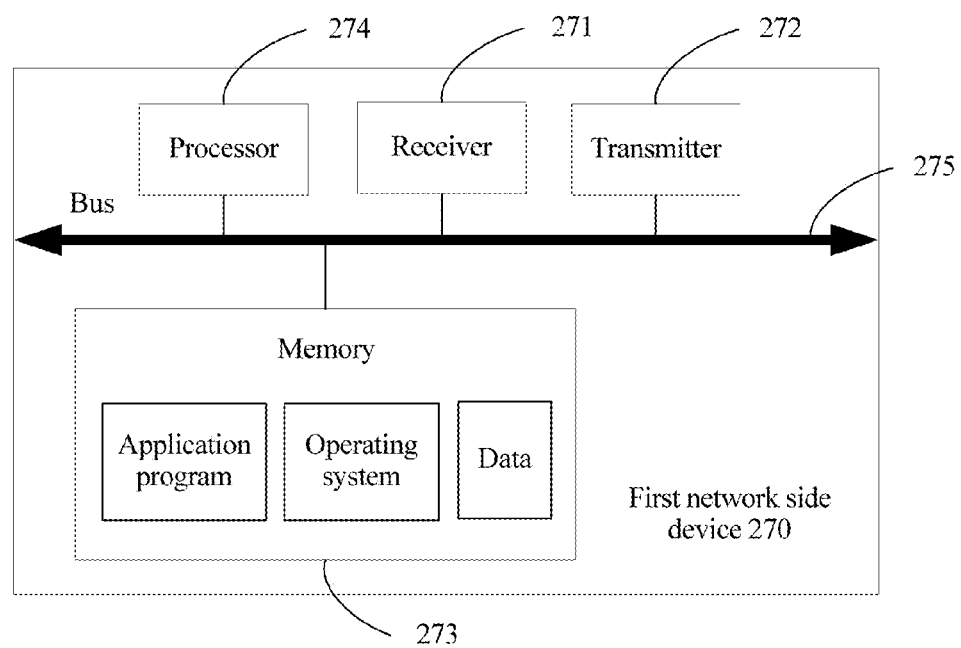
FIG. 27 is a schematic structural diagram of a still further first network side device according to an embodiment of the present application.

As shown in FIG. 27, the first network side device 270 includes a receiver 271, a transmitter 272, a memory 273, a processor 274, and a bus 275, where the receiver 271, the transmitter 272, the memory 273, and the processor 274 are connected and implement mutual communication by using the bus 275, and the memory 273 is configured to store data processed by the processor 274.

The bus 275 may be an industry standard architecture (ISA for short) bus, a peripheral component interconnect (PCI for short) bus, an extended industry standard architecture (EISA for short) bus, or the like. This is not limited herein. The bus 275 may be classified into an address bus, a data bus, a control bus, and the like. For ease of representation, the bus 275 is represented by using only one bold line in FIG. 27, which, however, does not mean that only one bus or one type of bus exists.

The memory 273 is configured to store data or executable program code, where the program code includes a computer operation instruction and may be specifically an operating system, an application program, or the like. The memory 273 may include a high-speed RAM memory, or may include a non-volatile memory (English: non-volatile memory), for example, at least one magnetic disk storage.

The processor 274 may be a central processing unit (CPU for short), or an application-specific integrated circuit (ASIC for short), or one or more integrated circuits configured to implement the embodiments of the present application.

The processor 274 is configured to execute the program code in the memory 273, to implement the data transmission method in the foregoing embodiments.

The processor 274 is configured to obtain transmission mode information, where the transmission mode information is used to instruct the first network side device to receive, in a first time period, uplink information sent by the terminal.

The receiver 271 is configured to receive, according to the transmission mode information obtained by the processor 274, the uplink information sent by the terminal.

The first time period and the second time period are a same time period.

Optionally, the transmission mode information is further used to instruct the first network side device to send, to the second network side device, the uplink information that is sent by the terminal and is received in the first time period; and the transmitter 272 is configured to: receive the transmission mode information from the processor 274, and send, to the second network side device according to the transmission mode information, the uplink information that is sent by the terminal and is received by the receiving unit in the first time period.

Optionally, the transmission mode information is further used to instruct the first network side device to send, to the second network side device, the downlink information that is sent by the second network side device to the terminal in the second time period; and the transmitter 272 is configured to: receive the transmission mode information from the processor 274, and send, to the second network side device according to the transmission mode information, the downlink information that is sent by the second network side device to the terminal in the second time period.

Further, optionally, the high-frequency communications system further includes a controller; the receiver 271 is configured to receive first terminal status information sent by the terminal, where the first terminal status information includes a first buffer status of the terminal and information indicating that the terminal supports full-duplex communication; the processor 274 is configured to obtain first channel state information, where the first channel state information includes state information of a channel from the first network side device to the terminal and state information of a channel from the terminal to the first network side device; the transmitter 272 is further configured to: receive the first terminal status information from the receiver, receive the first channel state information from the processor, and send the first terminal status information and the first channel state information to the controller, so that the controller configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device; and the receiver 271 is further configured to: receive the transmission mode information sent by the controller, and send the transmission mode information to the processor 274.

Further, optionally, the receiver 271 is configured to receive first terminal status information sent by the terminal, where the first terminal status information includes a first buffer status of the terminal and information indicating that the terminal supports full-duplex communication; the processor 274 is configured to obtain first channel state information, where the first channel state information includes state information of a channel from the first network side device to the terminal and state information of a channel from the terminal to the first network side device; the receiver 271 is further configured to receive second terminal status information and second channel state information that are sent by the second network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device; and the processor 274 is further configured to: receive the first terminal status information, the second terminal status information, and the second channel state information from the receiver 271, and configure the transmission mode information according to the first terminal status information, the first channel state information, the second terminal status information, and the second channel state information.

Further, optionally, the transmitter 272 is further configured to: receive the transmission mode information from the processor 274, and send the transmission mode information to the second network side device.

Further, optionally, the receiver is configured to receive first terminal status information sent by the terminal, where the first terminal status information includes a first buffer status of the terminal and information indicating that the terminal supports full-duplex communication; the processor 274 is configured to obtain first channel state information, where the first channel state information includes state information of a channel from the first network side device to the terminal and state information of a channel from the terminal to the first network side device; the transmitter 272 is configured to: receive the first terminal status information from the receiver 271, receive the first channel state information from the processor 274, and send the first terminal status information and the first channel state information to the second network side device, so that the second network side device configures the transmission mode information according to the first terminal status information, the first channel state information, second terminal status information, and second channel state information, and sends the transmission mode information to the first network side device, where the second terminal status information includes a second buffer status of the terminal and the information indicating that the terminal supports full-duplex communication, and the second channel state information includes state information of a channel from the second network side device to the terminal and state information of a channel from the terminal to the second network side device; and the receiver 271 is further configured to receive the transmission mode information sent by the second network side device.

Still further, the first network side device communicates with the terminal in a frequency division duplex mode; and the receiver 271 is further configured to receive the state information of the channel from the first network side device to the terminal sent by the terminal.

In the foregoing embodiment, when a terminal is located in an overlap area of a first cell and a second cell, only one network side device sends downlink information to the terminal in a same time period because a first network side device performs uplink information transmission with the terminal in a first time period, a second network side device performs downlink information transmission with the terminal in a second time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

An embodiment of the present application provides a second network side device 280, and the network side device is applied to the high-frequency communications system shown in FIG. 2, that is, a high-frequency communications system that includes at least one terminal UE1 and at least two network side devices. The at least two network side devices include a first network side device P1 and the second network side device P2, a first cell corresponding to the first network side device P1 is adjacent to a second cell corresponding to the second network side device P2, and the at least one terminal UE1 is located in an overlap area of the first cell and the second cell. The first network side device receives, in a first time period, uplink information sent by the terminal.

Figure 28:
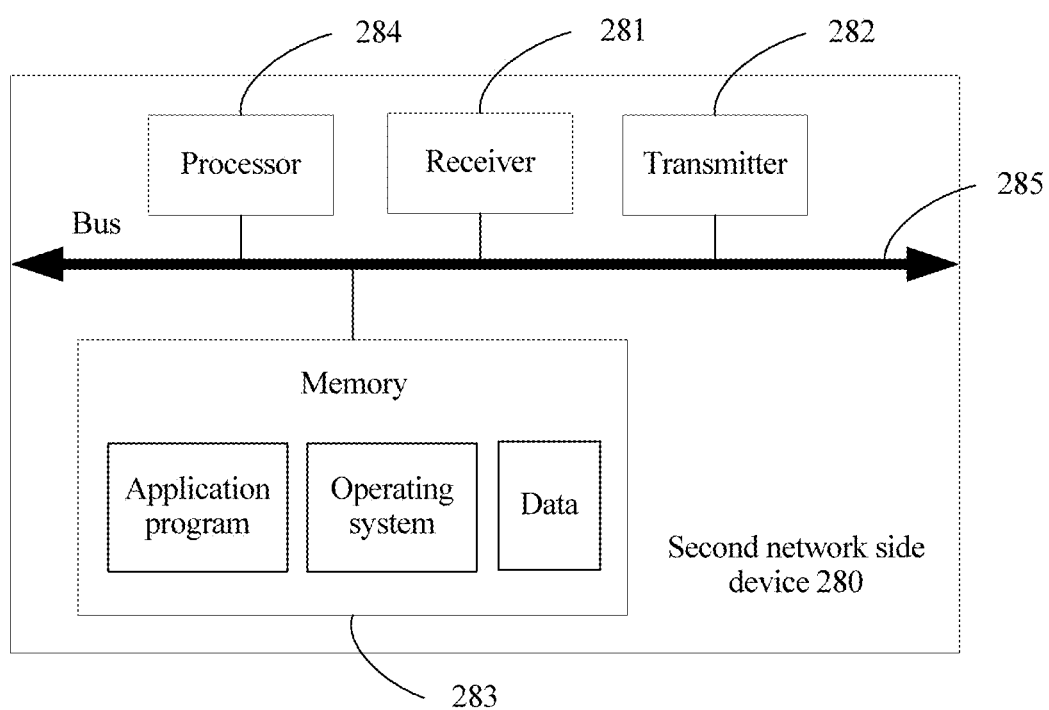
FIG. 28 is a schematic structural diagram of still yet another second network side device according to an embodiment of the present application.

As shown in FIG. 28, the network side device 280 includes a receiver 281, a transmitter 282, a memory 283, a processor 284, and a bus 285, where the receiver 281, the transmitter 282, the memory 283, and the processor 284 are connected and implement mutual communication by using the bus 285, and the memory 283 is configured to store data processed by the processor 284.

The bus 285 may be an industry standard architecture (ISA for short) bus, a peripheral component interconnect (PCI for short) bus, an extended industry standard architecture (EISA for short) bus, or the like. This is not limited herein. The bus 285 may be classified into an address bus, a data bus, a control bus, and the like. For ease of representation, the bus 285 is represented by using only one bold line in FIG. 28, which, however, does not mean that only one bus or one type of bus exists.

The memory 283 is configured to store data or executable program code, where the program code includes a computer operation instruction and may be specifically an operating system, an application program, or the like. The memory 283 may include a high-speed RAM, or may include a non-volatile memory, for example, at least one magnetic disk storage.

The processor 284 may be a central processing unit (CPU for short), or an application-specific integrated circuit (ASIC for short), or one or more integrated circuits configured to implement the embodiments of the present application.

The processor 284 is configured to execute the program code in the memory 283, to implement the data transmission method in the foregoing embodiments.

The processor 284 is configured to obtain transmission mode information, where the transmission mode information is used to instruct the second network side device to send downlink information to the terminal in a second time period.

The transmitter 282 is configured to: receive the transmission mode information from the processor 284, and send the downlink information to the terminal in the second time period according to the transmission mode information.

The first time period and the second time period are a same time period.

Optionally, the transmission mode information is further used to instruct the second network side device to receive the uplink information that is sent by the terminal, received by the first network side device in the first time period, and sent by the first network side device; and the receiver 281 is configured to: receive the transmission mode information from the processor 284, and receive, according to the transmission mode information, the uplink information that is sent by the terminal, received by the first network side device in the first time period, and sent by the first network side device.

Optionally, the transmission mode information is further used to instruct the second network side device to receive the downlink information that is sent by the first network side device, and sent by the second network side device to the terminal in the second time period; and the receiver 281 is configured to: receive the transmission mode information from the processor 284, and receive, according to the transmission mode information, the downlink information that is sent by the first network side device, and sent by the second network side device to the terminal in the second time period.

Further, optionally, the high-frequency communications system further includes a controller; the receiver 281 is configured to receive second terminal status information sent by the terminal, where the second terminal status information includes a second buffer status of the terminal and information indicating that the terminal supports full-duplex communication; the processor 284 is configured to obtain second channel state information, where the second channel state information includes state information of a channel from the second network side device to the terminal and state information of a channel from the terminal to the second network side device; the transmitter 282 is further configured to: receive the second terminal status information from the receiver, receive the second channel state information from the processor, and send the second terminal status information and the second channel state information to the controller, so that the controller configures the transmission mode information according to the second terminal status information, the second channel state information, first terminal status information, and first channel state information, and sends the transmission mode information to the second network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device; and the receiver 281 is further configured to: receive the transmission mode information sent by the controller, and send the transmission mode information to the processor.

Further, optionally, the receiver 281 is configured to receive second terminal status information sent by the terminal, where the second terminal status information includes a second buffer status of the terminal and information indicating that the terminal supports full-duplex communication; the processor 284 is configured to obtain second channel state information, where the second channel state information includes state information of a channel from the second network side device to the terminal and state information of a channel from the terminal to the second network side device; the receiver 281 is further configured to receive first terminal status information and first channel state information that are sent by the first network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device; and the processor 284 is further configured to: receive the second terminal status information, the first terminal status information, and the first channel state information from the receiver 281, and configure the transmission mode information according to the first terminal status information, the first channel state information, the second terminal status information, and the second channel state information.

Further, optionally, the transmitter 282 is further configured to: receive the transmission mode information from the processor 284, and send the transmission mode information to the first network side device.

Further, optionally, the receiver is configured to receive second terminal status information sent by the terminal, where the second terminal status information includes a second buffer status of the terminal and information indicating that the terminal supports full-duplex communication; the processor 284 is configured to obtain second channel state information, where the second channel state information includes state information of a channel from the second network side device to the terminal and state information of a channel from the terminal to the second network side device; the transmitter 282 is configured to: receive the second terminal status information from the receiver 281, receive the second channel state information from the processor 284, and send the second terminal status information and the second channel state information to the first network side device, so that the first network side device configures the transmission mode information according to the second terminal status information, the second channel state information, first terminal status information, and first channel state information, and sends the transmission mode information to the second network side device, where the first terminal status information includes a first buffer status of the terminal and the information indicating that the terminal supports full-duplex communication, and the first channel state information includes state information of a channel from the first network side device to the terminal and state information of a channel from the terminal to the first network side device; and the receiver 281 is further configured to receive the transmission mode information sent by the first network side device.

Still further, the second network side device communicates with the terminal in a frequency division duplex mode; and the receiver 281 is further configured to receive the state information of the channel from the second network side device to the terminal sent by the terminal.

In the foregoing embodiment, when a terminal is located in an overlap area of a first cell and a second cell, only one network side device sends downlink information to the terminal in a same time period because a second network side device performs downlink information transmission with the terminal in a second time period, a first network side device performs uplink information transmission with the terminal in a first time period, and the first time period and the second time period are a same time period. Therefore, when receiving downlink information sent by the second network side device, the terminal is prevented from being interfered with by downlink information sent by the first network side device, that is, inter-cell interference between neighboring cells is avoided. Further, because the first network side device performs uplink information transmission independently, and the second network side device performs downlink information transmission independently, physical layer synchronization and data sharing do not need to be performed between the network side devices. In addition, the two network side devices can communicate with the terminal in the overlap area of the first cell and the second cell by using a channel resource, thereby helping to make full use of a resource capacity of a high-frequency communications system.

The foregoing descriptions about implementation manners allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, multiple units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present application essentially, or the part contributing to the prior art, or all or some of the technical solutions may be implemented in the form of a software product. The software product is stored in a storage medium and includes instructions for instructing a device (which may be a single-chip microcomputer, a chip, or the like) or a processor to perform all or some of the steps of the methods described in the embodiments of the present application. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, the method comprising:
    obtaining, by a terminal, first terminal status information, wherein the first terminal status information comprises a first buffer status of the terminal and information indicating the terminal supports full-duplex communication, and the first buffer status is used to represent a buffer space that is allocated by the terminal for performing data transmission with a first network side device;
    sending, by the terminal, the first terminal status information to the first network side device;
    sending, by the terminal, uplink information to the first network side device in a first time period; and
    while sending the uplink information, simultaneously receiving, by the terminal in the first time period, downlink information from a second network side device.

2. The method according to claim 1, wherein the terminal communicates with the first network side device in a frequency division duplex mode, and the method further comprises:
    obtaining, by the terminal, state information of a channel between the first network side device and the terminal; and sending, by the terminal to the first network side device, the state information of the channel.

3. The method according to claim 1, wherein before the receiving, by the terminal in the first time period, downlink information sent by the second network side device, the method further comprises:
   obtaining, by the terminal, second terminal status information, wherein the second terminal status information comprises a second buffer status of the terminal and information indicating that the terminal supports full-duplex communication, and the second buffer status is used to represent a buffer space that is allocated by the terminal for performing data transmission with the second network side device; and
   sending, by the terminal, the second terminal status information to the second network side device.

4. The method according to claim 1, wherein the terminal communicates with the second network side device in a frequency division duplex mode, and the method further comprises:
   obtaining, by the terminal, state information of a channel between the second network side device and the terminal; and
   sending, by the terminal to the second network side device, the state information of the channel.

5. A terminal comprising:
   a receiver;
   a transmitter;
   a processor;
   a memory storing a program to be executed in the processor; and
   a bus, wherein the receiver, the transmitter, the memory, and the processor are connected and implement mutual communication by using the bus, and the memory is configured to store data processed by the processor;
   wherein the program when executed causes the processor to:
      obtain first terminal status information, wherein the first terminal status information comprises a first buffer status of the terminal and information indicating the terminal supports full-duplex communication, and the first buffer status is used to represent a buffer space that is allocated by the terminal for performing data transmission with a first network side device;
   wherein the transmitter is configured to:
      send the first terminal status information to the first network side device; and
      send uplink information to the first network side device in a first time period;
   wherein the receiver is configured to:
      while sending the uplink information, simultaneously receive, in the first time period, downlink information sent by a second network side device.

6. The terminal according to claim 5, wherein the terminal communicates with the first network side device in a frequency division duplex mode;
   the program comprises instructions for obtaining state information of a channel between the first network side device and the terminal; and
   the transmitter is further configured to: send, to the first network side device, the state information of the channel from the first network side device to the terminal.

7. The terminal according to claim 5, wherein the program comprises instructions for obtaining second terminal status information, wherein the second terminal status information comprises a second buffer status of the terminal and information indicating that the terminal supports full-duplex communication, and the second buffer status is used to represent a buffer space that is allocated by the terminal for performing data transmission with the second network side device; and
   the transmitter is further configured to: receive the second terminal status information from the processor, and send the second terminal status information to the second network side device.

8. The terminal according to claim 5, wherein the terminal communicates with the second network side device in a frequency division duplex mode;
   the program comprises instructions that cause the processor to obtain state information of a channel between the second network side device and the terminal; and
   the transmitter is further configured to: send, to the second network side device, the state information of the channel from the second network side device to the terminal.

9. A wireless communication system, comprising:
   a terminal configured to :
      send first terminal status information to a first network side device, wherein the first terminal status information comprises a first buffer status of the terminal and information indicating the terminal supports full-duplex communication, and the first buffer status is used to represent a buffer space that is allocated by the terminal for performing data transmission with the first network side device;
      send second terminal status information to a second network side device, wherein the second terminal status information comprises a second buffer status of the terminal and information indicating that the terminal supports full-duplex communication, and the second buffer status is used to represent a buffer space that is allocated by the terminal for performing data transmission with the second network side device;
      send uplink information to the first network side device in a first time period; and
      while sending the uplink information, simultaneously receive downlink information from the second network side device in the first time period;
   the first network side device configured to:
      receive the first terminal status information; and
      receive the uplink information from the terminal in the first time period;
   the second network side device configured to:
      receive the second terminal status information; and
      send the downlink information to the terminal in the first time period.

10. The system according to claim 9, the terminal is further configured to:
   send state information of a channel between the first network side device and the terminal to the first network side device.

11. The system according to claim 9, the terminal is further configured to:
   send state information of a channel between the second network side device and the terminal to the second network side device.

* * * * *